United States Patent
Takamatsu

(10) Patent No.: US 11,456,509 B2
(45) Date of Patent: *Sep. 27, 2022

(54) COMPOSITION FOR NON-AQUEOUS SECONDARY BATTERY FUNCTIONAL LAYER, NON-AQUEOUS SECONDARY BATTERY FUNCTIONAL LAYER, AND NON-AQUEOUS SECONDARY BATTERY

(71) Applicant: ZEON CORPORATION, Tokyo (JP)

(72) Inventor: Hiromi Takamatsu, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 16/094,591

(22) PCT Filed: Apr. 20, 2017

(86) PCT No.: PCT/JP2017/015943
§ 371 (c)(1),
(2) Date: Oct. 18, 2018

(87) PCT Pub. No.: WO2017/195564
PCT Pub. Date: Nov. 16, 2017

(65) Prior Publication Data
US 2019/0305279 A1     Oct. 3, 2019

(30) Foreign Application Priority Data

May 10, 2016   (JP) .............................. JP2016-094778

(51) Int. Cl.
| | |
|---|---|
| *H01M 50/411* | (2021.01) |
| *C08L 33/26* | (2006.01) |
| *H01M 4/139* | (2010.01) |
| *H01M 4/13* | (2010.01) |
| *H01M 50/409* | (2021.01) |
| *H01M 10/052* | (2010.01) |

(52) U.S. Cl.
CPC ........... *H01M 50/411* (2021.01); *C08L 33/26* (2013.01); *H01M 4/13* (2013.01); *H01M 4/139* (2013.01); *H01M 50/409* (2021.01); *C08L 2203/20* (2013.01); *C08L 2312/00* (2013.01); *H01M 10/052* (2013.01)

(58) Field of Classification Search
CPC ..................................................... H01M 2/1653
See application file for complete search history.

(56) References Cited

U.S. PATENT DOCUMENTS

| | | | | |
|---|---|---|---|---|
| 2014/0147726 A1* | 5/2014 | Toyoda | ................. | C08F 220/12 429/144 |
| 2016/0344007 A1* | 11/2016 | Toyoda | ................. | C09D 133/26 |
| 2016/0351873 A1 | 12/2016 | Sasaki | | |

FOREIGN PATENT DOCUMENTS

| | | |
|---|---|---|
| CN | 103620820 A | 3/2014 |
| JP | 2013145763 A | 7/2013 |
| JP | 2015185353 A | 10/2015 |
| WO | 2014196436 A1 | 12/2014 |
| WO | WO2015122322 A1 * | 8/2015 |
| WO | 2015145967 A1 | 10/2015 |

OTHER PUBLICATIONS

Oct. 28, 2019, the Extended European Search Report issued by the European Patent Office in the corresponding European Patent Application No. 17795925.1.
Nov. 13, 2018, International Preliminary Report on Patentability issued in the International Patent Application No. PCT/JP2017/015943.

* cited by examiner

*Primary Examiner* — Ula C Ruddock
*Assistant Examiner* — Thomas H. Parsons
(74) *Attorney, Agent, or Firm* — Kenja IP Law PC

(57) ABSTRACT

Disclosed is a composition for non-aqueous secondary battery functional layer which comprises non-conductive particles; a water-soluble polymer having a degree of swelling in electrolyte solution of greater than 1.0 time and 2.0 times or less; and a water-insoluble polymer having a volume-average particle diameter of 0.01 μm or more and 0.30 μm or less.

6 Claims, No Drawings

COMPOSITION FOR NON-AQUEOUS SECONDARY BATTERY FUNCTIONAL LAYER, NON-AQUEOUS SECONDARY BATTERY FUNCTIONAL LAYER, AND NON-AQUEOUS SECONDARY BATTERY

TECHNICAL FIELD

The present disclosure relates to compositions for non-aqueous secondary battery functional layer, non-aqueous secondary battery functional layers, and non-aqueous secondary batteries.

BACKGROUND

Non-aqueous secondary batteries (hereinafter may be simply referred to as "secondary batteries") such as lithium ion secondary batteries are small and light, high in energy density, and capable of repeated cycles of charge and discharge. For such characteristics, secondary batteries are used in a wide variety of applications. A non-aqueous secondary battery generally includes a positive electrode, a negative electrode, and a separator for separating the positive and negative electrodes from each other to prevent a short-circuit between them.

For secondary batteries, battery members have been used that include a functional layer for imparting desired performance (e.g., heat resistance and strength) to the battery member. Specific examples of such battery members include separators obtained by forming functional layers on separator substrates; and electrodes obtained by forming functional layers on electrode substrates formed by providing electrode mixed material layers on current collectors. Functional layers which have been used to potentially increase heat resistance, strength or other properties of battery members include those formed of porous membrane layers formed by binding non-conductive particles with a binder. Such a functional layer is formed by applying on the surface of a substrate (e.g., a separator or electrode substrate) a functional layer composition which comprises various polymers which may function as a binder and a dispersion medium, and drying the functional layer composition applied.

Recently, in an aim to further improve the performance of secondary batteries, extensive improvements have been made on compositions for non-aqueous secondary battery functional layer which are used for forming functional layers (see, e.g., PTL 1).

Specifically, PTL 1 discloses a porous member composition, a non-aqueous functional layer composition, which comprises a particulate polymer which is a random copolymer comprising 35% by mass or more of a (meth)acrylic acid alkyl ester monomer unit and 30% by mass or more and 65% by mass or less of an aromatic monovinyl monomer unit, wherein the particulate polymer has a degree of swelling in non-aqueous electrolyte solution of greater than 1.0 time and 2.0 times or less. With a particulate polymer having such a composition and properties being included in a functional layer composition, it is possible to increase the durability of a porous membrane constituting the functional layer as well as the stability of the functional layer composition under high shear conditions.

CITATION LIST

Patent Literature

PTL 1: WO2015/145967A

SUMMARY

Technical Problem

From the viewpoint of improving the performance of non-aqueous secondary batteries, it is required that the functional layer formed using a functional layer composition itself has low resistance and is capable of improving output characteristics of a secondary battery which comprises the functional layer. Recently, non-aqueous secondary batteries have been applied in a wide variety of fields and are required to exert excellent electrical characteristics even when used in severe conditions where they may experience large vibration. Further, non-aqueous secondary batteries generate heat as they charge and discharge and hence the functional layer provided in the battery may contract due to heating. From the viewpoint of improving high-temperature cycle characteristics of secondary batteries, it is also required that the functional layer does not easily contract even when heated, i.e., that the functional layer has sufficient heat contraction resistance.

However, in the case of a functional layer formed using the functional layer composition of PTL 1 which comprises a particulate polymer which has a specific composition and properties, there is concern that non-conductive particles are easily detached from the functional layer when vibration is applied to the functional layer while it is immersed in electrolyte solution. Further, the functional layer is insufficient in heat contraction resistance. Thus, there has been room to improve a secondary battery having such a functional layer in terms of its electrical characteristics, particularly high-temperature cycle characteristics and output characteristics.

An object of the present disclosure is therefore to provide a composition for non-aqueous secondary battery functional layer which can be used to form a non-aqueous secondary battery functional layer from which non-conductive particles and other components are not easily detached even when vibration is applied while it is immersed in electrolyte solution (i.e., has excellent resistance to vibration-causing detachment of components in electrolyte solution) and which has excellent heat contraction resistance. Another object of the present disclosure is to provide a non-aqueous secondary battery functional layer formed using the composition and a non-aqueous secondary battery which comprises the non-aqueous secondary battery functional layer and has excellent electrical characteristics (in particular, high-temperature cycle characteristics and output characteristics).

Solution to Problem

The inventor conducted extensive studies to solve the foregoing problem and discovered that the combined use of a water-soluble polymer having a specific property and a water-insoluble polymer having a specific range of particle diameter provides a composition for non-aqueous secondary battery functional layer which can be used to form a non-aqueous secondary battery functional layer having excellent resistance to vibration-causing detachment of components in electrolyte solution and excellent heat contraction resistance, and that the composition may improve electrical characteristics (in particular, high-temperature cycle characteristics and output characteristics) of a secondary battery having a functional layer formed using the composition. The inventor thus completed the present disclosure.

That is, the present disclosure is aimed at advantageously solving the foregoing problem and a composition for non-aqueous secondary battery functional layer of the present disclosure comprises: non-conductive particles; a water-soluble polymer having a degree of swelling in electrolyte solution of greater than 1.0 time and 2.0 times or less; and a water-insoluble polymer having a volume-average particle diameter of 0.01 µm or more and 0.30 µm or less. By allowing a composition for non-aqueous secondary battery to comprise non-conductive particles, a water-soluble polymer having a degree of swelling in electrolyte solution of greater than 1.0 time and 2.0 times or less, and a water-insoluble polymer having a volume-average particle diameter of 0.01 µm or more and 0.30 µm or less, it is possible to provide a composition for non-aqueous secondary battery functional layer which can be used to form a non-aqueous secondary battery functional layer having excellent resistance to vibration-causing detachment of components in electrolyte solution and excellent heat contraction resistance. It is also possible to improve electrical characteristics (in particular, high-temperature cycle characteristics and output characteristics) of a secondary battery having a functional layer formed using the functional layer composition.

The "degree of swelling in electrolyte solution" of the water-soluble polymer herein can be measured using a measurement method described in Examples. The "volume-average particle diameter" of the water-insoluble polymer herein refers to a particle diameter D50 where the cumulative volume from the fine side amounts to 50% of the entire volume in a particle size distribution (by volume) measured by laser diffraction method in accordance with JIS Z 8825. The term "water-soluble polymer" herein refers to a polymer which produces insoluble matter in an amount of less than 1.0% by mass when 0.5 g of the polymer is dissolved in 100 g of water at 25° C. The term "water-insoluble polymer" herein refers to a polymer which produces insoluble matter in an amount of 90% by mass or more when 0.5 g of the polymer is dissolved in 100 g of water at 25° C.

A preferred composition for non-aqueous secondary battery functional layer of the present disclosure is that the water-soluble polymer comprises 70% by mass or more and 99% by mass or less of a (meth)acrylamide monomer unit. When the water-soluble polymer comprises such a proportion of a (meth)acrylamide monomer unit, it is possible to further improve the heat contraction resistance of the functional layer and electrical characteristics of a secondary battery having the functional layer.

As used herein, "a polymer comprises a monomer unit" means that "a polymer obtained using a monomer comprises a structural unit derived from that monomer."

A preferred composition for non-aqueous secondary battery functional layer of the present disclosure is that the water-soluble polymer comprises 0.01% by mass or more and 2.0% by mass or less of a cross-linkable monomer unit. When the water-soluble polymer comprises such a proportion of a cross-linkable monomer unit, it is possible to further improve output characteristics of a non-aqueous secondary battery having a functional layer formed using the functional layer composition.

A preferred composition for non-aqueous secondary battery functional layer of the present disclosure is that the water-insoluble polymer has a degree of swelling in electrolyte solution of greater than 1.0 time and 3.0 times or less. When the water-insoluble polymer has a degree of swelling in electrolyte solution that falls within the range above, it is possible to further improve output characteristics of a non-aqueous secondary battery having a functional layer formed using the functional layer composition.

The "degree of swelling in electrolyte solution" of the water-insoluble polymer herein can be measured using a measurement method described in Examples.

A preferred composition for non-aqueous secondary battery functional layer of the present disclosure comprises the water-insoluble polymer in an amount 0.1 times or more and 2.5 times or less the amount of the water-soluble polymer by mass. When the ratio between the water-insoluble polymer and the water-soluble polymer contained in the functional layer composition falls within the range above, it is possible to obtain a composition for non-aqueous secondary battery functional layer which can be used to form a non-aqueous secondary battery functional layer having more excellent resistance to vibration-causing detachment of components in electrolyte solution and more excellent heat contraction resistance.

The non-aqueous secondary battery functional layer of the present disclosure is formed using any of the compositions for non-aqueous secondary battery functional layer described above.

The non-aqueous secondary battery of the present disclosure comprises the non-aqueous secondary battery functional layer.

Advantageous Effect

According to the present disclosure, it is possible to provide a composition for non-aqueous secondary battery functional layer which can be used to form a non-aqueous secondary battery functional layer having excellent resistance to vibration-causing detachment of components in electrolyte solution and excellent heat contraction resistance. Using this composition it is possible to suitably form a non-aqueous secondary battery functional layer having excellent resistance to vibration-causing detachment of components in electrolyte solution and excellent heat contraction resistance, and a non-aqueous secondary battery having the functional layer, which has excellent electrical characteristics (in particular, high-temperature cycle characteristics and output characteristics).

DETAILED DESCRIPTION

Embodiments of the present disclosure will now be described.

The composition for non-aqueous secondary battery functional layer of the present disclosure is used as a material for preparing a non-aqueous secondary battery functional layer. The non-aqueous secondary battery functional layer of the present disclosure is formed using the composition for non-aqueous secondary battery functional layer of the present disclosure. The non-aqueous secondary battery of the present disclosure comprises at least the non-aqueous secondary battery functional layer of the present disclosure.

(Composition for Non-Aqueous Secondary Battery Functional Layer)

The composition for non-aqueous secondary battery functional layer of the present disclosure is a slurry composition which comprises non-conductive particles, a water-soluble polymer, and a water-insoluble polymer, and optionally further comprises additives or other agents, with water or the like being present as a dispersion medium. The composition comprises as the water-soluble polymer a polymer having a degree of swelling in electrolyte solution of greater than 1.0 time and 2.0 times or less and as the water-insoluble polymer a polymer having a volume-average particle diameter of 0.01 μm or more and 0.30 μm or less.

Because the composition for non-aqueous secondary battery functional layer of the present disclosure comprises a combination of a water-soluble polymer having a specific property and a water-insoluble polymer having a specific range of particle diameter, it is possible to form a non-aqueous secondary battery functional layer having excellent resistance to vibration-causing detachment of components in electrolyte solution and excellent heat contraction resistance.

<Non-Conductive Particles>

The non-conductive particles refer to particles that dissolve neither in the dispersion medium of the composition for non-aqueous secondary battery functional layer nor in the non-aqueous electrolyte solution of secondary batteries and retain their shape even in such media. Because the non-conductive particles are also electrochemically stable, they stably present in the functional layer in the use environment of secondary batteries.

[Types of Non-Conductive Particles]

As the non-conductive particles, for example, various types of inorganic and organic particles can be used.

Specifically, both inorganic particles and organic microparticles other than the water-insoluble polymer can be used as the non-conductive particles. Preferred materials of the non-conductive particles are those present stably and have electrochemical stability in the use environment of non-aqueous secondary batteries. Specific examples of inorganic particles which may be used as the non-conductive particles include particles of oxides such as aluminum oxide (alumina), hydrated aluminum oxide (boehmite (A100H)), gibbsite ($Al(OH)_3$), silicon oxide, magnesium oxide (magnesia), calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. These particles may be subjected to element replacement, surface treatment, solid solution treatment and/or the like where necessary. Preferred inorganic particles to be added as the non-conductive particles are barium sulfate particles and alumina particles.

Examples of organic particles that can be used as the non-conductive particles include various types of cross-linked polymer particles made of polyethylene, polystyrene, polydivinylbenzene, cross-linked styrene/divinylbenzene copolymer, polyimide, polyamide, polyamideimide, melamine resin, phenol resin, or benzoguanamine-formaldehyde condensate; and common organic particles such as heat resistant polymer particles made of polysulfone, polyacrylonitrile, polyaramide, polyacetal or thermoplastic polyimide.

Also usable are organic particles having a core-shell structure whose core and shell are formed of polymers having different compositions and/or properties. Any type of organic particles having a core-shell structure can be used and examples thereof may include such organic particles wherein the core polymer is formed by polymerizing a (meth)acrylate monomer (e.g., methyl acrylate, ethyl acrylate, butyl acrylate, methyl methacrylate, ethyl methacrylate, and 2-ethylhexyl acrylate), an acid group-containing monomer (e.g., (meth)acrylic acid), and a cross-linkable monomer (e.g., di(meth)acrylate compound such as ethylene dimethacrylate, diethylene glycol dimethacrylate, ethylene glycol dimethacrylate, diethylene glycol diacrylate, 1,3-butylene glycol diacrylate) and wherein the shell polymer is formed by polymerizing an aromatic monovinyl monomer such as styrene or a styrene derivative such as styrene sulfonic acid. The proportions of monomer units of the core polymer of the organic particle preferably range from 50% by mass or more and 100% by mass or less (meth)acrylate monomer unit, 0.1% by mass or more and 20% by mass or less acid group-containing monomer unit, and 0.1% by mass or more and 5% by mass or less cross-linkable monomer unit, based on the total (100% by mass) of all the monomer units of the organic particle. The proportions of monomer units of the shell polymer of the organic particle preferably range from 20% by mass or more and 100% by mass or less aromatic monovinyl monomer unit based on the total (100% by mass) of all the monomer units of the organic particle.

Preferred organic particles are those having a core-shell structure, with organic particles having a core-shell structure whose core comprises a methyl methacrylate monomer unit, a methacrylic acid monomer unit, and an ethylene glycol dimethacrylate monomer unit and whose shell comprises a styrene monomer unit being more preferred.

The term "(meth)acryl" herein is used to mean acryl or methacryl.

Organic particles which can be used as the non-conductive particles preferably have a glass-transition temperature of greater than 30° C. and 200° C. or less. In particular, when the non-conductive particles are organic particles having a core-shell structure, it is preferred that at least the shell polymer has a glass-transition temperature of greater than 30° C. and 200° C. or less.

The organic particles differ from a water-insoluble polymer (later described) in that they do not have a binding ability in contrast to the water-insoluble polymer. The organic particles do not encompass such a water-insoluble polymer. The organic particles are water-insoluble organic particles which produce insoluble matter in an amount of 90% by mass or more when 0.5 g is dissolved in 100 g of water at 25° C.

One type of non-conductive particles may be used alone or two or more different types of non-conductive particles may be used in combination. For example, as the non-conductive particles, one or more different types of inorganic particles may be used in combination, one or more different types of organic particles may be used in combination, or one or more different types of inorganic particles and one or more different types of organic particles may be used in combination.

[Properties of Non-Conductive Particles]

The volume-average particle diameter of the non-conductive particles is preferably 0.1 μm or more, more preferably 0.2 μm or more, even more preferably 0.3 μm or more, but preferably 2.0 μm or less, more preferably 1.5 μm or less, even more preferably 1.2 μm or less. When the volume-average particle diameter of the non-conductive particles is not less than the lower limit value above, it is possible to prevent reductions in the ion conductivity of the functional layer due to excessive increases in the Gurley value of the functional layer and allow a secondary battery having the functional layer to exert excellent output characteristics. When the volume-average particle diameter of the non-conductive particles is not greater than the upper limit value above, it is possible to increase the packing density of the non-conductive particles in the functional layer to thereby increase the strength and heat contraction resistance of the functional layer in electrolyte solution.

The "volume-average particle diameter" of the non-conductive particles herein refers to a particle diameter where the cumulative volume from the fine side amounts to 50% of the entire volume in a particle size distribution (by volume) measured by laser diffraction method.

In the case of inorganic particles, the specific surface area of the non-conductive particles is preferably 3.0 m$^2$/g or more, more preferably 3.5 m$^2$/g or more, even more preferably 4.0 m$^2$/g or more, but preferably 8.0 m$^2$/g or less, more preferably 7.5 m$^2$/g or less, even more preferably 7.0 m$^2$/g or less. In the case of organic particles, the specific surface area of the non-conductive particles is preferably 0.01 m$^2$/g or more, more preferably 0.02 m$^2$/g or more, even more preferably 0.05 m$^2$/g or more, but preferably 5.0 m$^2$/g or less, more preferably 4.0 m$^2$/g or less, even more preferably 2.0 m$^2$/g or less. When the specific surface area of the non-conductive particles is not less than the lower limit value above, it is possible to increase the packing density of the non-conductive particles in the functional layer to thereby increase the strength and heat contraction resistance of the functional layer in electrolyte solution. When the specific surface area of the non-conductive particles is not greater than the upper limit value above, it is possible to prevent reductions in the conductivity of ions which contribute to battery reactions (i.e., ion conductivity) due to excessive increases in the Gurley value of the functional layer and allow a secondary battery having the functional layer to exert excellent output characteristics.

<Water-Soluble Polymer>

The water-soluble polymer contained in the composition for non-aqueous secondary battery functional layer of the present disclosure preferably comprises 0.01% by mass or more and 2.0% by mass or less of a cross-linkable monomer unit. The water-soluble polymer preferably further comprises 70% by mass or more and 99% by mass or less of a (meth)acrylamide monomer unit. Optionally, the water-soluble polymer further comprises an acid group-containing monomer unit and other monomer units. As the water-soluble polymer, a mixture of different types of water-soluble polymers may be used.

[Composition of Water-Soluble Polymer]

—Cross-Linkable Monomer Unit—

Cross-linkable monomers which may form the cross-linkable monomer unit can be monomers which may form a cross-linked structure upon polymerization. Specific examples include monofunctional monomers having a thermally cross-linkable group and one ethylenically unsaturated bond per molecule, and polyfunctional monomers having two or more ethylenically unsaturated bonds per molecule. Examples of thermally cross-linkable groups of monofunctional monomers include epoxy group, N-methylol amide group, oxetanyl group, oxazoline group, and combinations thereof. With a cross-linkable monomer unit being included, it is possible for the water-insoluble polymer to have a moderate degree of swelling in electrolyte solution while increasing the powder fall resistance of the functional layer.

The cross-linkable monomers may be hydrophobic or hydrophilic.

The term "hydrophobic" as used herein for a cross-linkable monomer means that the cross-linkable monomer has no hydrophilic group. The term "hydrophilic" as used herein for a cross-linkable monomer means that the cross-linkable monomer has a hydrophilic group. The "hydrophilic group" of the cross-linkable monomer refers to carboxylic acid group, hydroxyl group, sulfo group, phosphate group, epoxy group, thiol group, aldehyde group, amide group, oxetanyl group, or oxazoline group.

Examples of hydrophobic cross-linkable monomers include polyfunctional (meth)acrylates such as allyl (meth)acrylate, ethylene di(meth)acrylate, ethylene glycol di(meth)acrylate, diethylene glycol di(meth)acrylate, triethylene glycol di(meth)acrylate, tetraethylene glycol di(meth)acrylate, and trimethylolpropane-tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene.

Examples of hydrophilic cross-linkable monomers include vinyl glycidyl ether, allyl glycidyl ether, N-methylol acrylamide, acrylamide, and allyl methacrylamide.

These cross-linkable monomers can be used alone or in combination of two or more. Preferred is ethylene glycol dimethacrylate.

The proportion of the cross-linkable monomer unit in the water-soluble polymer is preferably 0.01% by mass or more based on the total amount (100% by mass) of all the monomer units contained in the water-soluble polymer, more preferably 0.02% by mass or more, even more preferably 0.03% by mass or more, but preferably 2.0% by mass or less, more preferably 1.8% by mass or less, even more preferably 1.5% by mass or less. When the proportion of the cross-linkable monomer unit in the water-soluble polymer is not less than the lower limit value above, it is possible to prevent reductions in the ion conductivity of the functional layer due to excessive increases in the degree of swelling in electrolyte solution of the water-soluble polymer to thereby improve output characteristics of a secondary battery. When the proportion of the cross-linkable monomer unit in the water-soluble polymer is not greater than the upper limit value above, it is possible to improve the polymerization stability when preparing the water-soluble polymer to thereby allow efficient preparation of the water-soluble polymer, which in turn makes it possible to increase the production efficiency of secondary batteries.

—(Meth)Acrylamide Monomer Unit—

Examples of (meth)acrylamide monomers which may form the (meth)acrylamide monomer unit include acrylamide and methacrylamide, with acrylamide being particularly preferred. Either one of them may be used alone, or both of them may be used in combination at any ratio.

The proportion of the (meth)acrylamide monomer unit in the water-soluble polymer is preferably 70% by mass or more based on the total amount (100% by mass) of all the monomer units contained in the water-soluble polymer, more preferably 72% by mass or more, even more preferably 75% by mass or more, but preferably 99% by mass or less, more preferably 95% by mass or less, even more preferably 93% by mass or less. When the proportion of the (meth)acrylamide monomer unit in the water-soluble polymer is not less than the lower limit value above, it is possible to increase the heat contraction resistance of the functional layer. When the proportion of the (meth)acrylamide monomer unit in the water-soluble polymer is not greater than the upper limit value above, the dispersion stability of solids in the functional layer composition increases, making it possible for a functional layer formed using the functional layer composition to be homogenous and consequently improving electrical characteristics of a secondary battery having the functional layer.

—Acid Group-Containing Monomer Unit—

Examples of acid-group containing monomers which may form the acid group-containing monomer unit include carboxyl group-containing monomers, sulfo group-containing monomers, and phosphate group-containing monomers.

Examples of carboxyl group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methylvinyl sulfonic acid, (meth)allyl sulfonic acid, (meth)acrylic acid-2-sulfoethyl, 2-acrylamide-2-methyl propane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

The term "(meth)allyl" herein is used to mean allyl and/or methallyl, and the term "(meth)acryloyl" herein is used to mean acryloyl and/or methacryloyl.

Preferred acid group-containing monomers are carboxyl group-containing monomers, with monocarboxylic acids being more preferred, and acrylic acid being even more preferred.

The acid group-containing monomers may be used alone or in combination of two or more at any ratio.

The proportion of the acid group-containing monomer unit in the water-soluble polymer is preferably 2.0% by mass or more, but preferably 40.0% by mass or less, more preferably 35.0% by mass or less, even more preferably 30.0% by mass or less. When the proportion of the acid group-containing monomer unit in the water-soluble polymer is not less than the lower limit value above, it is possible to reduce aggregation of solids in the functional layer composition and to moderately increase the degree of swelling in electrolyte solution of the water-soluble polymer. When the proportion of the acid group-containing monomer unit in the water-soluble polymer is not greater than the upper limit value above, it is possible to prevent excessive increases in the degree of swelling in electrolyte solution of the water soluble polymer in the functional layer formed using the functional layer composition to thereby improve output characteristics of a secondary battery having the functional layer. Further, when the proportion of the acid group-containing monomer unit in the water-soluble polymer is not greater than the upper limit value above, it is possible to reduce the amount of water derived from the water-soluble polymer, which may be contained in the functional layer formed using the functional layer composition, to thereby improve cycle characteristics of a secondary battery having the functional layer. —Content Ratio of (Meth)acrylamide Monomer Unit to Acid Group-Containing Monomer Unit—

The water-soluble polymer preferably comprises the (meth)acrylamide monomer unit in an amount 2.0 times or more the amount of the acid group-containing monomer unit, more preferably 3.0 times or more, even more preferably 5.0 times or more, but preferably 40 times or less, more preferably 35 times or less, even more preferably 30 times or less. When the content ratio of the (meth)acrylamide monomer unit to the acid group-containing monomer unit is not less than the lower limit value above, it is possible to prevent excessive increases in the degree of swelling in electrolyte solution of the water soluble polymer in the functional layer formed using the functional layer composition to thereby improve output characteristics of a secondary battery having the functional layer. When the content ratio of the (meth)acrylamide monomer unit to the acid group-containing monomer unit is not greater than the upper limit value above, the dispersion stability of solids in the functional layer composition increases, making it possible for a functional layer formed using the functional layer composition to be homogenous and consequently improving electrical characteristics of a secondary battery having the functional layer.

—Other Monomer Units—

The water-soluble polymer may comprise one or more other monomer units in addition to the monomer units described above. Any monomer capable of forming other monomer units can be used and examples include vinyl cyanide monomers.

Optionally, the water-soluble polymer having a specific range of degree of swelling in electrolyte solution may be mixed with amine compounds. Blending the water-soluble polymer with amine compounds reduces changes in viscosity of the functional layer composition during storage to thereby improve the storage stability of the functional layer composition. Any amine compound can be used and examples include hydroxylamine sulfate, diethylhydroxylamine, dimethylhydroxylamine, dipropylhydroxylamine, isopropylhydroxyamine, and isothiazoline compounds. These amine compounds may be used alone or in combination of two or more at any ratio. Amine compounds may be added in an amount of 0.01 parts by mass or more and 0.5 parts by mass or less per 100 parts by mass (in terms of solid content) of the water-soluble polymer. It is also preferred that a mixture of the water-soluble polymer and an amine compound mixed according to their blending ratio in the functional layer composition has a degree of swelling in electrolyte solution that falls within the specific range described above.

Further optionally, the water-soluble polymer having the specific range of degree of swelling in electrolyte solution may be mixed with synthetic polymers. Any synthetic polymer can be used and examples include polyacrylic acid salts such as sodium polyacrylate; copolymers of polyvinyl alcohol, polyethylene oxide, polyvinyl pyrrolidone, acrylic acid or acrylic acid salts with vinyl alcohol; completely or partially saponified copolymers of maleic anhydride or maleic acid or fumaric acid with vinyl acetate; modified polyvinyl alcohols; modified polyacrylic acids, polyethylene glycol; polycarboxylic acids; ethylene-vinyl alcohol copolymers; vinyl acetate polymers; and acrylamide polymers having a carboxylic acid group. Synthetic polymers can be mixed at any ratio so long as the effect of the functional layer composition according to the present disclosure is not compromised, e.g., in an amount of 100 parts by mass or less per 100 parts by mass (in terms of solid content) of the water-soluble polymer. It is also preferred that a mixture of the water-soluble polymer and a synthetic polymer mixed according to the their blending ratio in the functional layer composition has a degree of swelling in electrolyte solution that falls within the specific range above.

[Degree of Swelling in Electrolyte Solution of Water-Soluble Polymer]

The water-soluble polymer preferably has a degree of swelling in electrolyte solution of greater than 1.0 time, more preferably greater than 1.15 times, even more preferably greater than 1.2 times, but preferably 2.0 times or less, more preferably 1.8 times or less, even more preferably 1.5 times or less. When the degree of swelling in electrolyte solution of the water-soluble polymer is not less than the lower limit value above, the functional layer easily allows ions that contribute to battery reactions to pass therethrough in electrolyte solution to thereby improve output characteristics of a secondary battery. When the degree of swelling in electrolyte solution of the water-soluble polymer is not greater than the upper limit value above, it is possible to prevent closure of voids formed in the functional layer due to excessive swelling of the water-soluble polymer against the electrolyte solution in the functional layer to thereby avoid reduction in ion conductivity of the functional layer and improve characteristics of a secondary battery. Further, when the degree of swelling in electrolyte solution of the water-soluble polymer is not greater than the upper limit value above, it is possible for water-insoluble particles to firmly retain the non-conductive particles inside the functional layer in the electrolyte solution to thereby increase the resistance to vibration-causing detachment of components.

[Weight-Average Molecular Weight of Water-Soluble Polymer]

The weight-average molecular weight (Mw) of the water-soluble polymer contained in the composition for non-aqueous secondary battery functional layer of the present disclosure is preferably 200,000 or more and 10,000,000 or less, more preferably 1,000,000 or less. When the weight-average molecular weight of the water-soluble polymer is not less than the lower limit value above, it is possible to reduce elution of the water-soluble polymer into electrolyte solution in a non-aqueous secondary battery and thereby to prevent reductions in high-temperature cycle characteristics of a non-aqueous secondary battery, as well as improve the coatability of the functional layer composition to thereby increase the heat contraction resistance of the functional layer. When the weight-average molecular weight of the water-soluble polymer is not greater than the upper limit value above, it is possible to increase the coatability of the functional layer composition and the flexibility of the functional layer.

The "weight-average molecular weight of the water-soluble polymer" herein can be measured by the method described in Examples.

[Blending Amount of Water-Soluble Polymer]

When the non-conductive particles are inorganic particles, the amount of the water-soluble polymer contained in the composition for non-aqueous secondary battery functional layer of the present disclosure is preferably 0.1 parts by mass or more per 100 parts by mass of the non-conductive particles, more preferably 0.3 parts by mass or more, even more preferably 0.5 parts by mass or more, but preferably 5.0 parts by mass or less, more preferably 4.0 parts by mass or less, even more preferably 3.0 parts by mass or less. When the non-conductive particles are organic particles, the amount of the water-soluble polymer is preferably 0.4 parts by mass or more per 100 parts by mass of the non-conductive particles, more preferably 1.2 parts by mass or more, even more preferably 2 parts by mass or more, but preferably 20 parts by mass or less, more preferably 16 parts by mass or less, even more preferably 12 parts by mass or less. When the water-soluble polymer content is not less than the lower limit value above, it is possible to impart moderate viscosity to the functional layer composition to thereby avoid formation of a non-uniform functional layer due to repelling of the functional layer composition upon application on a substrate. When the water-soluble polymer content is not less than the lower limit value above, it is possible to prevent settling of solids of the functional layer composition or localization of solids upon application on a substrate, making it possible to form a uniform functional layer. When the water-soluble polymer content is not greater than the upper limit value above, it is possible to prevent the generation of streaks or unevenness upon application on a substrate, making it possible to form a uniform functional layer. Further, when the water-soluble polymer content is not greater than the upper limit value above, it is possible to avoid the space between non-conductive particles in the resulting functional layer from being excessively large to thereby increase the packing density of the non-conductive particles in the functional layer, making it possible to increase the heat contraction resistance of the functional layer.

[Method of Preparing Water-Soluble Polymer]

The water-soluble polymer can be produced by polymerizing a monomer composition which comprises the monomers described above for example in aqueous medium such as water. The proportions of monomers in the monomer composition can be determined in accordance with the proportions of corresponding repeat units (monomer units) in the water-soluble polymer.

Any mode of polymerization can be used, such as solution polymerization, suspension polymerization, bulk polymerization, or emulsion polymerization. As the polymerization reaction, any polymerization reaction can be used, such as ionic polymerization, radical polymerization, or living radical polymerization.

Additives used for polymerization, such as emulsifiers, dispersants, polymerization initiators and polymerization promoters, may be those commonly used in the art. These additives may also be used in amounts commonly used in the art. The polymerization condition may be adjusted as appropriate depending on the polymerization method and polymerization initiator used, for example.

<Water-Insoluble Polymer>

The water-insoluble polymer contained in the composition for non-aqueous secondary battery functional layer of the present disclosure is dispersed in the composition with their particulate form being retained, and functions as a binder together with the water-soluble polymer described above. Because the composition for non-aqueous secondary battery functional layer of the present disclosure comprises as a binder component a combination of a water-soluble polymer having a relatively small degree of swelling in electrolyte solution and, as described later, a water-insoluble polymer having a relatively small volume-average particle diameter, it is possible not only to firmly retain solids such as non-conductive particles contained in the functional layer composition inside the functional layer, but to increase the strength of the functional layer itself. This prevents contraction of the functional layer due to heating associated with charging and discharging of the secondary battery. Thus, with the composition for non-aqueous secondary battery functional layer of the present disclosure, it is possible to improve not only the resistance to vibration-causing detachment of components, but heat contraction resistance of the functional layer.

[Composition of Water-Insoluble Polymer]

The water-insoluble polymer is usually a polymer which is not soluble in water. Any water-insoluble polymer can be used and water-insoluble polymers known in the art which may be used as a binder when forming a functional layer, such as thermoplastic elastomers, can be used. Specifically, preferred are conjugated diene polymers and acrylic polymers, with acrylic polymers being more preferred. These water-insoluble polymers may be used alone or in combination of two or more.

Conjugated diene polymers which may be used as the water-insoluble polymer are polymers which comprise a conjugated diene monomer unit. Specific examples of conjugated diene polymers include, but not particularly limited to, copolymers which comprise both an aromatic vinyl monomer unit and an aliphatic conjugated diene monomer unit, such as styrene-butadiene copolymer (SBR); butadiene rubber (BR); acrylic rubber (NBR) (copolymers containing an acrylonitrile unit and a butadiene unit); and hydrides and fluorides thereof.

Acrylic polymers which may be suitably used as the water-insoluble polymer are polymers which comprise a (meth)acrylate monomer unit. Examples of usable (meth)acrylate monomers which may form the (meth)acrylate monomer unit include (meth)acrylic acid alkyl esters such as methyl acrylate, ethyl acrylate, butyl acrylate, methyl methacrylate, ethyl methacrylate, and 2-ethylhexyl acrylate.

In addition to the (meth)acrylate monomer unit, acrylic polymers preferably comprise at least one monomer unit selected from the group consisting of a (meth)acrylonitrile monomer unit, an acid group-containing monomer unit, a cross-linkable monomer unit, an aromatic monovinyl monomer unit, and a fluorine-containing monomer unit, more preferably comprise an acid group-containing monomer unit, a cross-linkable monomer unit, and an aromatic monovinyl monomer unit. As acid group-containing monomers which may form the acid group-containing monomer unit and cross-linkable monomers which may form the cross-linkable monomer unit, monomers similar to those described above for the water-soluble polymer can be used. In particular, as cross-linkable monomers used for preparing the water-insoluble polymer, it is preferred to use hydrophilic and hydrophobic cross-linkable monomers in combination. It is particularly preferred to use allyl glycidyl ether and allyl methacrylate in combination. As monomers which may form the aromatic monovinyl monomer unit, it is possible to use, for example, aromatic monovinyl monomers such as styrene, styrene sulfonic acid, α-methyl styrene, and vinyl toluene.

Examples of fluorine-containing monomers which may form the fluorine-containing monomer unit include fluorine-containing olefins such as vinylidene fluoride, ethylene tetrafluoride, propylene hexafluoride, ethylene trifluoride chloride, and perfluoroalkyl vinyl ether; and fluorine-containing (meth)acrylates represented by the following general formula (1):

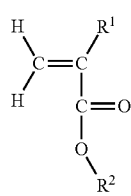

(1)

where $R^1$ is hydrogen or methyl and $R^2$ is $C_1$-$C_{18}$ hydrocarbon having a fluorine atom.

Examples of $R^2$ in the general formula (1) include $C_1$-$C_{12}$ fluoroalkyl, $C_6$-$C_{16}$ fluoroaryl, and $C_7$-$C_{18}$ fluoroaralkyl, with $C_1$-$C_{12}$ fluoroalkyl being preferred. Preferred specific examples of $R^2$ in the general formula (1) include 2,2,2-trifluoroethyl, 2,2,3,3,3-pentafluoropropyl, 1,1,1,3,3,3-hexafluoropropane-2-yl, O-(perfluorooctyl)ethyl, 2,2,3,3-tetrafluoropropyl, 2,2,3,4,4,4-hexafluorobutyl, 1H, 1H, 5H-octafluoropentyl, 1H, 1H,9H-perfluoro-1-nonyl, 1H, 1H, 11H-perfluoroundecyl, and perfluorooctyl.

Preferred fluorine-containing olefins are vinylidene fluoride and vinylidene hexafluoride. Preferred fluorine-containing (meth)acrylates represented by the general formula (1) are 2,2,2-trifluoroethyl methacrylate, 2,2,2-trifluoroethyl acrylate, and 1,1,1,3,3,3-hexafluoroisopropyl acrylate.

[Properties of Water-Insoluble Polymer]

The water-insoluble polymer needs to have a volume-average particle diameter of 0.01 μm or more and 0.30 μm or less, more preferably 0.05 μm or more, even more preferably 0.10 μm or more, but preferably 0.28 μm or less, more preferably 0.25 μm or less. When the volume-average particle diameter of the water-insoluble polymer is not less than the lower limit value above, it is possible to prevent increases in the internal resistance of a secondary battery having a functional layer due to excessive packing of the water-insoluble polymer which leads to excessive reductions in the ion conductivity of the functional layer, thereby improving rate characteristics of the secondary battery. Further, when the volume-average particle diameter of the water-insoluble polymer is not less than the lower limit value above, it is possible to improve high-temperature cycle characteristics of the secondary battery. When the volume-average particle diameter of the water-insoluble polymer is not greater than the upper limit value above, the water-insoluble polymer is well dispersed within the functional layer so that the water-insoluble polymer present in the space between non-conductive particles contributes to firm retention of the non-conductive particles inside the functional layer, thereby not only allowing the functional layer to have increased resistance to vibration-causing detachment of components in electrolyte solution, but preventing detachment (fall) of the non-conductive particles from the functional layer when the functional layer is not immersed in electrolyte solution. Further, when the volume-average particle diameter of the water-insoluble polymer is not greater than the upper limit value above, the water-insoluble polymer located near the surface of the functional layer increases adhesion of the functional layer, thereby increasing peel strength and, further, heat contraction resistance.

The "volume-average particle diameter of the water-insoluble polymer" herein refers to a particle diameter D50 where the cumulative volume from the fine side amounts to 50% of the entire volume in a particle size distribution (by volume) measured by laser diffraction method. When two or more different water-insoluble polymers are used, the volume-average particle diameter D50, measured in accordance with the measurement method described above for a dispersion liquid containing the two or more different water-insoluble polymers in the same proportions as in the functional layer composition, needs to fall within the range described above.

The volume-average particle diameter of the water-insoluble polymer is preferably 0.15 times or more the volume-average particle diameter of the non-conductive particles, but preferably 0.60 times or less, more preferably 0.48 times or less. When the ratio of the volume-average particle diameter of the water-insoluble polymer to the volume-average particle diameter of the non-conductive particles falls within the range described above, the water-insoluble polymer present in the space between the non-conductive particles contributes to firm retention of the non-conductive particles inside the functional layer, thereby allowing the functional layer to have increased resistance to vibration-causing detachment of components in electrolyte solution.

When the ratio falls within the range described above, it is also possible to increase the heat contraction resistance of the functional layer.

The water-insoluble polymer preferably has a glass-transition temperature of 30° C. or below, more preferably 20° C. or below, even more preferably 15° C. or below, but preferably −50° C. or above, more preferably −40° C. or above, even more preferably −20° C. or above. When the glass-transition temperature of the water-insoluble polymer is not greater than the upper limit value above, it becomes easy to handle the functional layer composition. When the glass-transition temperature of the water-insoluble polymer is not less than the lower limit value above, it is possible to increase the peel strength by increasing the binding ability of the functional layer.

The "glass-transition temperature of the water-insoluble polymer" herein can be measured by differential scanning calorimetry in accordance with JIS K 7121.

The water-insoluble polymer preferably has a degree of swelling in electrolyte solution of greater than 1.0 time, more preferably greater than 1.1 times, even more preferably greater than 1.2 times, but preferably 3.0 times or less, more preferably 2.5 times or less, even more preferably 2.3 times or less, particularly preferably 2.2 times or less. When the degree of swelling in electrolyte solution of the water-insoluble polymer is not less than the lower limit value above, it is possible for the functional layer to easily allow ions that contribute to battery reactions to pass therethrough in electrolyte solution to thereby improve output characteristics of a secondary battery. When the degree of swelling in electrolyte solution of the water-insoluble polymer is not greater than the upper limit value above, it is possible to avoid blockage of the channels of ions that contribute to battery reactions due to excessive swelling of the water-insoluble polymer in the functional layer, thereby improving output characteristics of a secondary battery. Further, when the degree of swelling in electrolyte solution of the water-insoluble polymer is not greater than the upper limit value above, it is possible to prevent the ability of the water-insoluble polymer to retain the non-conductive particles from excessively decreasing due to excessive swelling of the water-insoluble polymer, thereby increasing the resistance to vibration-causing detachment of components in electrolyte solution and improving high-temperature cycle characteristics of a secondary battery.

The degree of swelling in electrolyte solution of the water-insoluble polymer can be controlled by any means, e.g., by adjusting the composition of the water-insoluble polymer. Specifically, one method of controlling the degree of swelling in electrolyte solution of the water-insoluble polymer involves the use of a fluorine-containing (meth)acrylate represented by the general formula (1) given above. This prevents excessive increases in the degree of swelling in electrolyte solution of the water-insoluble polymer. When the fluorine-containing (meth)acrylate represented by the general formula (1) is used, from the viewpoint of improving high-temperature cycle characteristics of a secondary battery having a functional layer to be obtained, it is preferred that the proportion of a monomer unit derived from the fluorine-containing (meth)acrylate represented by the general formula (1) in the water-insoluble polymer is 5.0% by mass or less based on the total amount (100% by mass) of all the monomer units contained in the water-insoluble polymer, more preferably 4.0% by mass or less, even more preferably 3.0% by mass or less. Another method of controlling the degree of swelling in electrolyte solution of the water-insoluble polymer involves the use of the cross-linkable monomers described above. This prevents excessive increases in the degree of swelling in electrolyte solution of the water-insoluble polymer. When the cross-linkable monomer is used, from the viewpoint of improving high-temperature cycle characteristics of a secondary battery having a functional layer to be obtained, it is preferred that the proportion of the cross-linkable monomer units in the water-insoluble polymer is 3.0% by mass or less, more preferably 2.5% by mass or less, even more preferably 2.3% by mass or less. From the viewpoint of ensuring that the degree of swelling in electrolyte solution is not excessively increased, when the cross-linkable monomer is used to control the degree of swelling in electrolyte solution of the water-insoluble polymer, it is preferred that the proportion of the cross-linkable monomer units in the water-insoluble polymer is 0.1% by mass or more.

The water-insoluble polymer may have a core-shell structure whose core and shell are formed of polymers having different properties. In this case, at least the shell may satisfy the requirements of glass-transition temperature and degree of swelling in electrolyte solution described above.

[Blending Amount of Water-Insoluble Polymer]

When the non-conductive particles are inorganic particles, the amount of the water-insoluble polymer contained in the composition for non-aqueous secondary battery functional layer of the present disclosure is preferably 0.2 parts by mass or more per 100 parts by mass of the non-conductive particles, more preferably 0.5 parts by mass or more, even more preferably 1.0 part by mass or more, but preferably 10 parts by mass or less, more preferably 7 parts by mass or less, even more preferably 5 parts by mass or less. When the non-conductive particles are organic particles, the amount of the water-insoluble polymer is preferably 0.8 parts by mass or more per 100 parts by mass of the non-conductive particles, more preferably 2.0 parts by mass or more, even more preferably 4.0 parts by mass or more, but preferably 40 parts by mass or less, more preferably 28 parts by mass or less, even more preferably 20 parts by mass or less. When the amount of the water-insoluble polymer is not less than the lower limit value above, it is possible to increase the peel strength of the functional layer by preventing detachment of the non-conductive particles from the functional layer not immersed in electrolyte solution. Further, when the amount of the water-insoluble polymer is not less than the lower limit value above, it is possible for the functional layer to have increased resistance to vibration-causing detachment of components. When the amount of the water-insoluble polymer is not greater than the upper limit value above, it is possible to prevent reductions in output characteristics of a secondary battery due to excessive increases in the Gurley value of the functional layer which leads to increases in the internal resistance of the secondary battery.

The amount of the water-insoluble polymer in the functional layer composition is preferably 0.1 times or more the amount of the water-soluble polymer described above, more preferably 0.3 times or more, even more preferably 0.7 times or more, but preferably 2.5 times or less, more preferably 2.2 times or less, even more preferably 2.0 times or less. When the ratio of the amount of the water-insoluble polymer to the amount of the water-soluble polymer (water-insoluble polymer/water-soluble polymer) is not less than the lower limit value above, it is possible to increase the peel strength of the functional layer by preventing detachment of the non-conductive particles from the functional layer not immersed in electrolyte solution. Further, when the value of water-insoluble polymer/water-soluble polymer ratio is not less than the lower limit value above, it is possible for the functional layer to have increased resistance to vibration-causing detachment of components. When the value of water-insoluble polymer/water-soluble polymer ratio is not greater than the upper limit value above, it is possible to prevent reductions in output characteristics of a secondary battery by preventing excessive increases in the internal resistance of the secondary battery due to excessive increases in the Gurley value of the functional layer.

The amounts of the water-insoluble polymer and water-soluble polymer in the functional layer composition can be measured in the manner described below, for example. First, as for the amount of the water-soluble polymer, the proportions of the water-soluble polymer, dispersing agent and wetting agent are quantified by liquid chromatography for a filtrate obtained by filtering the functional layer composition to remove solids. Alternatively, a portion of the filtrate is dried, the weight of the dried product is measured, and the amount of the water-soluble polymer contained in the filtrate per unit amount can be calculated. Second, as to the amount of the water-insoluble polymer, solids obtained by filtration are re-dispersed in medium such as water and centrifuged to isolate the non-conductive particles and water-insoluble polymer contained in the solids. A fraction containing the water-insoluble polymer is recovered, dried, and the weight of the dried product is measured.

[Method of Preparing Water-Insoluble Polymer]

The water-insoluble polymer can be produced for example by polymerizing a monomer composition which comprises monomers for the water-insoluble polymer in aqueous solvent such as water. The proportions of the monomers in the monomer composition can be determined in accordance with the proportions of the corresponding monomer units (repeat units) in the resulting water-insoluble polymer.

Any polymerization mode can be used, such as solution polymerization, suspension polymerization method, bulk polymerization or emulsion polymerization. Any polymerization method can be used, such as ionic polymerization, radical polymerization, or living radical polymerization.

For emulsifiers, dispersants, polymerization initiators, polymerization aids and other additives used for polymerization, those commonly used in the art may be used. These additives may also be used in amounts commonly used in the art. The polymerization conditions may be adjusted as appropriate depending on the type of the polymerization method and initiator used, for example.

<Additives>

The composition for non-aqueous secondary battery functional layer may comprise optional other components in addition to the components described above. Any component known in the art can be used so long as it does not affect the battery reactions. Further, such other components may be used alone or in combination of two or more.

Examples of other components include additives known in the art, such as dispersants and wetting agents.

[Dispersant]

Any dispersant can be used and examples include polycarboxylic acid, sodium polycarboxylate, ammonium polycarboxylate, polycarboxylic acid/sulfonic acid copolymer, sodium salt of polycarboxylic acid/sulfonic acid copolymer, and ammonium salt of polycarboxylic acid/sulfonic acid copolymer.

When the non-conductive particles are inorganic particles, it is preferred that the dispersant is used in an amount of 0.1 parts by mass or more per 100 parts by mass of the non-conductive particles, more preferably 0.5 parts by mass or more, even more preferably 1.0 part by mass or more, but preferably 5 parts by mass or less, more preferably 4 parts by mass or less, even more preferably 3.5 parts by mass or less. When the non-conductive particles are organic particles, it is preferred that the dispersant is used in an amount of 0.4 parts by mass or more per 100 parts by mass of the non-conductive particles, more preferably 2.0 parts by mass or more, even more preferably 4.0 parts by mass or more, but preferably 20 parts by mass or less, more preferably 16 parts by mass or less, even more preferably 14 parts by mass or less. When the amount of the dispersant is not less than the lower limit value above, it is possible to sufficiently increase the dispersion stability of the functional layer composition to thereby moderately increase the packing density of the non-conductive particles in a functional layer formed using the functional layer composition, so that the functional layer can have increased heat contraction resistance by increasing strength while ensuring flexibility. When the amount of the dispersant is not greater than the upper limit value above, it is possible to reduce the amount of water remaining in the functional layer formed using the functional layer composition to thereby improve high-temperature cycle characteristics of a secondary battery.

The weight-average molecular weight of the dispersant is preferably 100,000 or less. When the weight-average molecular weight of the dispersant is 100,000 or less, it is possible to prevent excess increases in the viscosity of the functional layer composition, thus improving the handleability and coatability of the composition. The "weight-average molecular weight of the dispersant" herein can be measured by the method described in Examples below.

The degree of swelling in electrolyte solution of the dispersant is usually 1.1 times or more and 3.0 times or less.

[Wetting Agent]

Any wetting agent can be used, e.g., a nonionic or anionic surfactant can be used, with a nonionic surfactant being preferred. The weight-average molecular weight of the wetting agent is preferably 100,000 or less. The "weight-average molecular weight of the wetting agent" herein can be measured by the method described in Examples below. The degree of swelling in electrolyte solution of the wetting agent is usually greater than 2 times.

When the non-conductive particles are inorganic particles, it is preferred that the wetting agent is used in an amount of 0.05 parts by mass or more per 100 parts by mass of the non-conductive particles, more preferably 0.1 parts by mass or more, even more preferably 0.15 parts by mass or more, but preferably 2 parts by mass or less, more preferably 1.5 parts by mass or less, even more preferably 1 part by mass or less. When the non-conductive particles are organic particles, it is preferred that the wetting agent is used in an amount of 0.2 parts by mass or more per 100 parts by mass of the non-conductive particles, more preferably 0.4 parts by mass or more, even more preferably 0.6 parts by mass or more, but preferably 8 parts by mass or less, more preferably 6 parts by mass or less, even more preferably 4 parts by mass or less. When the amount of the wetting agent is not less than the lower limit value above, wettability on substrate surface increases, so that repelling can be prevented when the functional layer composition is applied on a substrate thus facilitating the formation of a functional layer. When the amount of the wetting agent is not greater than the upper limit value above, it is possible to prevent increases in the internal resistance of a secondary battery due to excessive increases in the Gurley value of the functional layer of the secondary battery, thereby improving output characteristics of the secondary battery.

<Dispersion Medium>

Water is usually used as a dispersion medium of the functional layer composition of the present disclosure. As the dispersion medium, it is also possible to use a mixture of water and one or more other media so long as the mixture can dissolve the water-soluble polymer and retain the water-insoluble polymer in particulate form. Any media can be used as such other media and examples include cycloaliphatic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N,N-dimethylformamide. These compounds may be used alone or in combination of two or more at any ratio.

<Method of Producing Composition for Non-Aqueous Secondary Battery Functional Layer>

The composition for non-aqueous secondary battery functional layer of the present disclosure can be obtained by any method which comprises mixing the non-conductive particles, the water-soluble polymer, the water-insoluble polymer and optional additives in the presence of a dispersion medium such as water.

The components can be mixed by any method and mixed in any order. For efficient dispersing of the components, mixing is preferably effected using a dispersing machine as a mixer. The dispersing machine is preferably capable of uniformly dispersing and mixing the components. Examples of the dispersing machine include ball mill, sand mill, pigment disperser, grinding machine, ultrasonic disperser, homogenizer, and planetary mixer.

<Properties of Composition for Non-Aqueous Secondary Battery Functional Layer>

The composition for non-aqueous secondary battery functional layer of the present disclosure preferably has a solid concentration of 35% by mass or more, more preferably 40% by mass or more, but preferably 65% by mass or less, more preferably 60% by mass or less, even more preferably 55% by mass or less. When the solid concentration falls within the range above, the coatability of the functional layer composition increases as well as a moderate settling property is imparted to the functional layer composition, so that repelling can be prevented upon application. When the solid concentration is not greater than the upper limit value above, moderate viscosity is imparted to the functional layer composition, so that the leveling property of the functional layer composition increases to allow for uniform application.

The functional layer composition preferably has a viscosity of 10 mPa·s or more and 100 mPa·s or less. When the viscosity of the functional layer composition falls within the range above, it is possible to sufficiently increase the coatability of the functional layer composition. The "viscosity of the composition for non-aqueous secondary battery functional layer" herein refers to a viscosity measured using a B-type viscometer at a rotor rotation rate of 60 rpm at 25° C. The viscosity of the composition can be adjusted by regulating the molecular weight of the water-soluble polymer and the amounts of the components in the composition.

(Non-Aqueous Secondary Battery Functional Layer)

The non-aqueous secondary battery functional layer of the present disclosure is formed of the composition for non-aqueous secondary battery functional layer described above, e.g., by applying the functional layer composition on a surface of a suitable substrate to form thereon a coating film, and drying the coating film formed. Specifically, the non-aqueous secondary battery functional layer of the present disclosure is formed of a dried product of the composition for non-aqueous secondary battery functional layer described above, and usually comprises the non-conductive particles, the water-soluble polymer having a degree of swelling in electrolyte solution of greater than 1.0 time and 2.0 times or less, the water-insoluble polymer having a volume-average particle diameter of 0.01 μm or more and 0.30 μm or less, and optional additives. When the non-conductive particles, the water-soluble polymer and/or the water-insoluble polymer comprise the cross-linkable monomer unit, the polymer which comprises the cross-linkable monomer unit may be cross-linked upon drying of the functional layer composition or upon heat treatment optionally performed after drying (specifically, the functional layer composition may comprise a cross-linked product of the non-conductive particles, the water-soluble polymer and/or the water-insoluble polymer).

The non-aqueous secondary battery functional layer of the present disclosure is formed using the functional layer composition described above and therefore shows excellent resistance to vibration-causing detachment of components in electrolyte solution and excellent heat contraction resistance, as well as improves electrical characteristics of a secondary battery which comprises the functional layer.

<Substrate>

Any substrate can be used as a substrate to be coated with the functional layer composition. For example, a coating film of the functional layer composition may be formed on a surface of a releasing substrate. The coating film is then dried to form a functional layer and the releasing substrate is peeled off from the functional layer. In this way, the functional layer peeled from the release substrate can be used as a self-supporting film to form a battery member of a secondary battery. Specifically, the functional layer peeled off from the releasing substrate may be laminated onto a separator substrate to form a separate having the functional layer. Further, the functional layer peeled off from the releasing substrate may be laminated onto an electrode substrate to form an electrode having the functional layer. However, from the viewpoint of improving the production efficiency of a battery member by not performing the step of peeling the functional layer, it is preferred to use a separator substrate or an electrode substrate as the substrate. The functional layer provided on the separator substrate or electrode substrate can be suitably used as a protective layer for improving heat resistance, strength and other properties of the separator or electrode.

[Separator Substrate]

Any separator substrate can be used and examples include those known in the art, such as organic separator substrates. The organic separator substrate is a porous member made of organic material and examples of organic separator substrates include microporous membranes or non-woven fabrics which comprise a polyolefin resin such as polyethylene or polypropylene, or an aromatic polyamide resin. Preferred are microporous membranes or non-woven fabrics made of polyethylene for their excellent strength. The separator substrate can have any thickness, but preferably 5 μm or more and 30 μm or less, more preferably 5 μm or more and 20 μm or less, even more preferably 5 μm or more and 18 μm or less. When the thickness of the separator substrate is 5 μm or more, sufficient safety can be obtained. When the thickness of the separator substrate is 30 μm or less, it is possible to prevent reductions in the ion conductivity and therefore output characteristics of a secondary battery, as well as prevent increases in heat contraction force of the separator substrate to increase heat resistance.

[Electrode Substrate]

Any electrode substrate can be used as a positive or negative electrode substrate and examples include electrode substrates having an electrode mixed material layer formed on a current collector.

Current collectors, electrode active materials (positive and negative electrode active materials) in electrode mixed material layers, binders for electrode mixed material layers (binders for positive and negative mixed material layers), and methods of forming electrode mixed material layers on current collectors can be those known in the art. For example, those described in JP2013145763A can be used.

<Method of Forming Non-Aqueous Secondary Battery Functional Layer>

Examples of methods of forming a functional layer on a substrate such as the separator substrate or electrode substrate described above include:

1) applying the functional layer composition of the present disclosure on the surface of the separator substrate or electrode substrate (hereinafter, on the surface of the electrode mixed material layer in the case of the electrode substrate), and drying the coated separator substrate or electrode substrate;

2) immersing the separator substrate or electrode substrate into the functional layer composition of the present disclosure, and drying the coated separator substrate or electrode substrate; and 3) applying the functional layer composition of the present disclosure on a releasing substrate, drying the coated releasing substrate to form thereon a functional layer, and transferring the resultant functional layer to a surface of the separator substrate or electrode substrate.

Preferred is method 1) as the thickness of the functional layer can be easily controlled. More specifically, Method 1) includes applying the functional layer composition on the substrate (coating step) and drying the functional layer applied on the substrate to form a functional layer (functional layer forming step).

[Coating Step]

Any method can be used in the coating step to apply the functional layer composition on the substrate. Examples of methods of applying the functional layer composition include doctor blade coating, reverse roll coating, direct roll coating, gravure coating, extrusion coating, and brush coating.

[Functional Layer Forming Step]

Any drying method known in the art can be used in the functional layer forming step to dry the functional layer composition applied on the substrate. Examples of drying methods include drying by warm, hot or low-humidity air, vacuum drying, and drying by irradiation with infrared rays or electron beams. Any drying condition can be used, but the drying temperature is preferably 50° C. to 150° C. and the drying time is preferably 5 to 30 minutes.

<Thickness of Functional Layer>

The thickness of the functional layer formed using the composition for non-aqueous secondary battery functional layer of the present disclosure is preferably 0.5 μm or more and 5 μm or less. When the thickness of the functional layer is 0.5 μm or more, the protective function can be further enhanced, so that the heat resistance and strength of a battery member having the functional layer can be further increased. When the thickness of the functional layer is 5 μm or less, it is possible for a secondary battery to exhibit excellent output characteristics.

(Battery Member Having Functional Layer)

Battery members (separator and electrode) having the functional layer of the present disclosure may comprise components other than the functional layer disclosed above in addition to the separator substrate or electrode substrate and the functional layer of the present disclosure, so long as the effect of the present disclosure is not significantly compromised.

Any component can be used as a component other than the functional layer of the present disclosure so long as it does not correspond to the functional layer of the present disclosure, and examples of other components include adhesion layers provided on the functional layer of the present disclosure for bonding battery members together.

(Non-Aqueous Secondary Battery)

The non-aqueous secondary battery of the present disclosure comprises the non-aqueous secondary battery functional layer of the present disclosure described above. More specifically, the non-aqueous secondary battery of the present disclosure comprises a positive electrode, a negative electrode, a separator, and an electrolyte solution, wherein the non-aqueous secondary battery functional layer is included in at least one of the positive electrode, the negative electrode, and the separator, which are battery members. The non-aqueous secondary battery of the present disclosure may exhibit excellent battery characteristics (e.g., high-temperature cycle characteristics and output characteristics).

<Positive Electrode, Negative Electrode and Separator>

At least one of the positive electrode, the negative electrode and the separator used in the secondary battery of the present disclosure comprises the functional layer of the present disclosure. Specifically, as a positive electrode or the negative electrode having the functional layer, it is possible to use an electrode formed by providing the functional layer of the present disclosure on an electrode substrate which is formed by forming an electrode mixed material layer on a current collector. As a separator having the functional layer, it is possible to use a separator formed by providing the functional layer of the present disclosure on a separator substrate. As the electrode substrate and the separator substrate, it is possible to use those described in the section titled "Non-Aqueous Secondary Battery Functional Layer" above.

As positive and negative electrodes and separator which do not have the functional layer, it is possible to use electrodes formed of the electrode substrate described above and the separator substrate described above, respectively.

<Electrolyte Solution>

As the electrolyte solution, typically used is an organic electrolyte solution obtained by dissolving a supporting electrolyte into organic solvent. The supporting electrolyte is, for example, a lithium salt in the case of lithium-ion secondary batteries. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation. These electrolytes may be used alone or in combination or two or more. Normally, the lithium ion conductivity tends to increase as a supporting electrolyte having a higher degree of dissociation is used. Thus, the lithium ion conductivity can be adjusted by the type of the supporting electrolyte used.

Any organic solvent which can dissolve the supporting electrolyte can be used for the electrolyte solution. In the case of lithium-ion secondary batteries, suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Alternatively, a mixture of two or more of these solvents may be used. Preferred are carbonates for their high permittivity and a wide stable potential region. Normally, the lithium ion conductivity tends to increase as a solvent having a lower viscosity is used. Thus, the lithium ion conductivity can be adjusted by the type of the solvent used.

The concentration of the electrolyte in the electrolyte solution can be adjusted as appropriate. Further, any additive known in the art can be added to the electrolyte solution.

<Method of Manufacturing Non-Aqueous Secondary Battery>

The non-aqueous secondary battery of the present disclosure can be manufactured for example stacking a positive electrode and a negative electrode with a separator provided therebetween, rolling or folding the resulting laminate as necessary, placing it in a battery container, filling the battery container with an electrolyte solution, and sealing the container. At least one of the positive electrode, the negative electrode, and the separator should have the functional layer. In order to prevent pressure increase inside the battery and occurrence of overcharging or overdischarging, an overcurrent preventing device such as a fuse or a PTC device; an expanded metal; or a lead plate may be provided as necessary. The battery may have any shape, such as coin, button, sheet, cylindrical, square, or flattened shape.

EXAMPLES

Hereinafter, the present disclosure will be specifically described with reference to Examples; however, the disclosure is not limited to Examples. In the following, "%", "ppm" and "parts" used to express quantities are by mass, unless otherwise specified.

In a polymer produced by copolymerization of more than one monomer, the percentage of a structural unit formed by polymerization of a monomer in the polymer is consistent with the proportion (blending ratio) of the monomer in the total monomers used for the polymerization of the polymer, unless otherwise indicated.

In Examples and Comparative Examples, the volume-average particle diameters of non-conductive particles and water-insoluble polymers; the weight-average molecular weights of water-soluble polymers, dispersants, and wetting agents; the degrees of swelling in electrolyte solution of water-soluble polymers and water-insoluble polymers; and the grass-transition temperature of water-insoluble polymers were measured by the methods described below. The dispersion stability of functional layer compositions; the heat contraction resistance, peel strength, and resistance to vibration-causing detachment of components of functional layers; and output characteristics and high-temperature cycle characteristics of secondary batteries were evaluated by the methods described below.

<Volume-Average Particle Diameter of Non-Conductive Particles>

For non-conductive particles provided or prepared in Examples and Comparative Examples, aqueous dispersion liquids having a solid concentration of 0.1% by mass were prepared and measured for their particle size distribution (by volume) using a laser diffraction particle size distribution meter ("SALD-7100", manufactured by Shimadzu Corporation). The particle diameter where the cumulative volume from the fine side amounts to 50% of the entire volume in the particle size distribution was recorded as a volume-average particle diameter.

<Weight-Average Molecular Weight>

The weight-average molecular weights of water-soluble polymers, dispersants and wetting agents were measured by gel permeation chromatography (GPC). Specifically, for the water-soluble polymers, dispersants and wetting agents provided or prepared in Examples and Comparative Examples, aqueous solutions having a solid concentration of 0.05% by mass were prepared as measurement samples. A calibration curve was prepared using a standard and a calculated weight-average molecular weight in terms of standard was obtained. The measurement conditions were as described below. The results are shown in Table 1.

Apparatus: Gel permeation chromatography (manufactured by Tosoh Corporation, pump: "DP-8020", autosampler: "AS-8020", detector: "RI-8020")

Columns: "Shodex OHpak (SB-G, SB-807HQ, SB-806MHQ)" manufactured by Showa Denko K.K.

Mobile phase: 0.1M Tris buffer (pH 9.0)+0.1M potassium chloride

Flow rate: 0.5 mL/min

Injection volume: 0.2 mL

Temperature: 40° C.

Detector: differential refractive index (RI) detector

Standard: monodispersed pullulan

<Degree of Swelling in Electrolyte Solution>

As an electrolytic solution used for measuring the degree of swelling in electrolytic solution, a 1 mol/L solution of $LiPF_6$ (supporting electrolyte) dissolved in a 3:7 (by volume) mixed solvent of ethylene carbonate (EC) and ethyl methyl carbonate (EMC) (SP value: 18.9 $(cal/cm^3)^{1/2}$) was used.

Solutions or aqueous dispersion liquids of water-soluble polymers, water-insoluble polymers, dispersants and wetting agents provided or prepared in Examples and Comparative Examples were placed in polytetrafluoroethylene Petri dishes and dried at 25° C. for 48 hours to prepare films having a thickness of 0.5 mm.

Each film prepared as described above was cut into a 1 cm×1 cm square piece to prepare a test piece. The weight of the test piece was measured and recorded as $W_0$. The test piece was immersed into the electrolyte solution at 60° C. for 72 hours and taken out from the electrolyte solution. The electrolyte solution on the surface of the test piece was wiped off, and the weight $W_1$ of the test piece after immersion was measured.

Using the weights $W_0$ and $W_1$, the degree of swelling S (times) was calculated using the equation $S=W_1/W_0$. The results are shown in Table 1.

<Glass-Transition Temperature of Water-Insoluble Polymer>

Next, a differential scanning calorimeter (DSC) curve was measured on a differential scanning calorimeter ("EXSTAR DSC6220" from SII NanoTechnology Inc.) for each of the water-insoluble polymers prepared in Examples and Comparative Examples. Specifically, a DSC curve was measured at normal temperature and normal humidity in the measurement temperature range of −100° C. to 100° C. at a heating rate of 10° C./min with 10 mg of dried sample being weighed into an aluminum pan and an empty aluminum pan being used as a reference. The glass-transition temperature of the water-insoluble polymer was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak in this heating step.

<Dispersion Stability of Functional Layer Composition>

200 g of the functional layer composition prepared in each of Examples and Comparative Examples was weighed, filtered through a mesh having an opening size of 10 μm, and the amount of the residue remaining on the mesh was weighed to obtain weight (a). The obtained filtrate was placed in a cup having a diameter of 130 mm and a height of 100 mm and stirred for 20 minutes at 3,000 rpm using disper (blade diameter: 60 mm). After stirring, the filtrate was filtered through a mesh having an opening size of 10 μm and the amount of the residue remaining on the mesh was weighed to obtain weight (b). Using the value obtained by subtracting the weight (a) from the weight (b) as the amount of the residue, the ratio of the residue with respect to the whole functional layer composition (200 g) was calculated and the dispersion stability of the functional layer composition was evaluated based on the criteria given below. A lesser amount of the residue indicates better dispersion stability of the functional layer composition, which means that the possibility that components once dispersed are re-aggregated is low.

A: The amount of residue is 50 ppm or less
B: The amount of residue is 50 ppm or more and 100 ppm or less
C: The amount of residue is 100 ppm or more <Heat Contraction Resistance of Functional Layer>

Functional layer-attached separators prepared in Examples and Comparative Examples were each cut into a 12 cm×12 cm square piece and a 10 cm×10 cm square image was drawn on the surface of the square piece with a black marker pen to prepare a test piece. The test piece was placed for 1 hour in a thermostat chamber set at 150° C., and % change in the area of the square image drawn on the square piece (=[(square area before placement in chamber)−(square area after placement in chamber)/square area before placement in chamber]×100(%)] was found as a % heat contraction and evaluated based on the criteria given below. A smaller % heat contraction indicates better heat contraction of the functional layer-attached separator.

A: % Heat contraction is less than 5%
B: % Heat contraction is 5% or more and less than 10%
C: % Heat contraction is 10% or more <Resistance to Vibration-Causing Detachment of Components>

Functional layer-attached separators prepared in Examples and Comparative Examples were each cut into a 5 cm×5 cm square piece and weighed to obtain weight $M_0$. The square piece was immersed into electrolyte solution solvent (3:7 (by volume) mixed solvent of ethylene carbonate (EC) and ethyl methyl carbonate (EMC)), subjected to ultrasonic vibration at 30 KHz for 10 minutes at 60° C., taken out from the solvent, dried at 60° C. for 10 hours, and weighed to obtain weight $M_1$. % Vibration-causing detachment of components ΔM was found using the equation ΔM (%)=$(M_0-M_1) \times M_0 \times 100$ and evaluated based on the criteria given below. A smaller value of ΔM indicates better durability of the functional layer.

A: ΔM is 0% or more and less than 20%
B: ΔM is 20% or more and less than 40%
C: ΔM is 40% or more and less than 60%
D: ΔM is 60% or more <Peel Strength>

Functional layer-attached separators prepared in Examples and Comparative Examples were each cut into a rectangular piece measuring 100 mm in length and 10 mm in width to prepare a test piece. An adhesive cellophane tape as specified in JIS Z1522 was previously affixed to a test stage. The test piece was attached to the cellophane tape with the functional layer facing down. In this way the test piece was attached to the cellophane tape on the surface of the functional layer. The stress at the time when one end of the separator was pulled and peeled in the vertical direction at a pulling rate of 10 mm/min was then measured. The measurement was made 3 times and an average of measured values was recorded as peel strength. A higher value of peel strength indicates higher adhesion between the functional layer and the separator.

A: Peel strength is 130 N/m or more
B: Peel strength is 120 N/m or more and less than 130 N/m
C: peel strength is 100 N/m or more and less than 120 N/m
D: Peel strength is less than 100 N/m <Output Characteristics of Secondary Battery>

The lithium ion secondary battery having a capacity of 800 mAh prepared in each of Examples and Comparative Examples was allowed to stand for 24 hours in an environment of 25° C.°. The battery was then charged at 0.1 C to 4.35V and discharged at 0.1 C to 3.0V in an environment of 25° C., and initial capacity $C_0$ was measured. The battery was then charged at 0.1 C to 4.35V and discharged at 2 C to 3.0V in the environment of 25° C., and capacity $C_1$ was measured. Rate characteristics expressed as $\Delta C=(C_0-C_1)/C_0 \times 100(\%)$ were evaluated, with a higher value indicating better rate characteristics.

A: ΔC is 90% or more
B: ΔC is 85% or more and less than 90%
C: ΔC is 80% or more and less than 85%
D: ΔC is less than 80%

<High-Temperature Cycle Characteristics of Secondary Battery>

The lithium ion secondary battery having a capacity of 800 mAh prepared in each of Examples and Comparative Examples was subjected to 200 cycles of charging to 4.35V and discharging to 3V at 0.5 C in an atmosphere at 45° C. and the discharge capacity of the battery was measured. An average of measured values for 5 lithium ion secondary batteries was recorded as a measurement value, and the percentage of the electric capacity after 200 cycles with respect to the discharge capacity at the end of 3 cycles was calculated to find % charge-discharge capacity retention. A higher value of % charge-discharge capacity retention indicates better high-temperature cycle characteristics.

A: % charge-discharge capacity retention is 80% or more
B: % charge-discharge capacity retention is 70% or more and less than 80%
C: % charge-discharge capacity retention is 60% or more and less than 70%
D: % charge-discharge capacity retention is less than 60%

Example 1

<Preparation of Water-Soluble Polymer>

710 g of ion-exchanged water was charged into a 1 L glass flask, heated to a temperature of 40° C. and the flask was purged with nitrogen gas at a flow rate of 100 mL/min. Next, 0.1 g (in terms of solid content) of ethylene glycol dimethacrylate (cross-linkable monomer), 89.9 g (in terms of solid content) of acrylamide ((meth)acrylamide monomer) and 10.0 g (in terms of solid content) of acrylic acid (acid group-containing monomer) were mixed and injected into the flask with a syringe. 8.0 g of 2.5% potassium persulfate aqueous solution as a polymerization initiator was added into the flask with a syringe. 15 minutes later, 20 g of 2.0% tetramethylethylenediamine aqueous solution as a polymerization aid was added with a syringe to initiate the reaction. 4 hours after the addition of the initiator, 4.0 g of 2.5% potassium persulfate aqueous solution as a polymerization initiator was added into the flask, 10 g of 2.0% tetramethylethylenediamine aqueous solution as a polymerization aid was added into the flask, and the temperature was raised to 60° C. to proceed the polymerization reaction. After 3 hours, the flask was opened to the air to quench the polymerization reaction, the product was deodorized at a temperature of 80° C., and the residual monomers were removed.

The product was adjusted to pH 8 using 5% sodium hydroxide aqueous solution to afford a water-soluble polymer. The degree of swelling in electrolyte solution and the weight-average molecular weight of the water-soluble polymer were measured by the methods described above. The results are shown in Table 1.

<Preparation of Water-Insoluble Polymer>

According to the following procedure, acrylic polymer (ACL1) was prepared as a water-insoluble polymer.

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate as a polymerization initiator, the gas phase was purged with nitrogen gas, and the temperature was raised to 60° C.

In another vessel, 50 parts of ion-exchanged water, 0.5 parts of sodium dodecylbenzene sulfonate as a dispersant; and 64 parts of 2-ethylhexyl acrylate (acrylate monomer), 30 parts of styrene (aromatic monovinyl monomer), 4 parts of acrylic acid (acid group-containing monomer), 1.8 parts of allyl glycidyl ether (hydrophilic cross-linkable monomer) and 0.2 parts of allyl methacrylate (hydrophobic cross-linkable monomer) as polymerizable monomers were mixed to afford a monomer mixture. The monomer mixture was continuously added to the reactor over 4 hours to effect polymerization. During addition, the polymerization reaction was carried out at 70° C. After completion of addition, the reaction mass was stirred for a further 3 hours at 80° C. and the reaction was quenched to afford an aqueous dispersion liquid which comprises acrylic polymer (ACL1) as a water-insoluble polymer.

The volume-average particle diameter, the degree of swelling in electrolyte solution, and the glass-transition temperature of the water-insoluble polymer were measured by the methods described above. The results are shown in Table 1.

<Preparation of Dispersant>

50 parts of water, 80 parts of acrylic acid, 19.92 parts of acrylamide-2-methylpropanesulfonic acid and 0.08 parts of 2-(N-acryloyl)amino-2-methyl-1,3-propane-disulfonic acid were mixed to afford a monomer composition. 150 parts of water was charged into a four-necked flask equipped with a thermometer, a stirrer and a reflux condenser, and the temperature was raised to 80° C. Subsequently, under stirring, the monomer composition and 10 parts of 30% sodium persulfate aqueous solution were continuously added dropwise into the flask with a metering pump over 3 hours, and a polymerization reaction was carried out at 80° C. After completion of the dropwise addition, the reaction mass was further aged for 1 hour while maintaining the system temperature at 80° C., and the polymerization reaction was completed. Thereafter, 120 parts of 32% sodium hydroxide aqueous solution was added into the flask to completely neutralize the reaction solution to afford an aqueous solution of a polycarboxylic acid/sulfonic acid copolymer. This polymer had a weight-average molecular weight of 11,000 and a degree of swelling in electrolyte solution of 1.5 times. This polycarboxylic acid/sulfonic acid copolymer was used as a dispersant.

<Preparation of Functional Layer Composition>

Ion-exchanged water was added to 100 parts of barium sulfate particles (specific gravity: 4.4 g/cm$^3$, specific surface area: 5.5 m$^2$/g, volume-average particle diameter: 0.50 µm) as non-conductive particles and 1.0 part of the polycarboxylic acid/sulfone acid copolymer to prepare a dispersion liquid having a solid concentration of 55% by mass. Using a medialess dispersing machine (LMZ-015, manufactured by Ashizawa Finetech Ltd.), the barium sulfate particles were dispersed with 0.4 mm diameter beads at a circumferential speed of 6 m/sec and a flow rate of 0.3 L/min. The volume-average particle diameter D50 of the barium sulfate particles in the dispersion liquid as measured by the laser diffraction particle size distribution meter ("SALD-7100", manufactured by Shimadzu Corporation) was 0.65 µm. To the dispersion liquid was added the water-soluble polymer in an amount of 2 parts by mass (in terms of solid content) per 100 parts by mass of the non-conductive particles. Next, 3.5 parts by mass (in terms of solid content) of the water-insoluble polymer and 0.3 parts by mass of a wetting agent (nonionic surfactant; 50/50 (by mole) ethylene oxide/propylene oxide polymer having a weight-average molecular weight of 8,000 and a degree of swelling in electrolyte solution of 2.2 times) were added per 100 parts by mass of the non-conductive particles. Ion-exchanged water was added to the dispersion liquid to a solid concentration of 50% by mass to prepare a functional layer composition in slurry form. The dispersion stability of the functional layer composition was evaluated by the method described above. The results are shown in Table 1.

<Preparation of Functional Layer-Attached Separator>

A single-layer polyethylene separator substrate (Gurley value: 155 sec/100 cc) having a width of 250 mm, a length of 1,000 mm, and a thickness of 12 µm manufactured by the wet process was coated with the functional layer composition to a dry film thickness of 2.0 µm at a speed of 20 m/min using a gravure coater, and dried in a drying oven at 50° C. to prepare a separator having a functional layer. The functional layer-attached separator obtained was wound up.

The heat contraction resistance, resistance to vibration-causing detachment of components, and peel strength of the functional layer-attached separator were evaluated by the methods described above. The results are shown in Table 1.

<Preparation of Particulate Binder for Negative Electrode>

A 5 MPa pressure-resistant vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR). The mixture was adjusted to pH 8 by the addition of 5% sodium hydroxide aqueous solution. Unreacted monomers were removed from the mixture by thermal-vacuum distillation. The mixture was then cooled to 30° C. or below to afford an aqueous dispersion liquid containing a desired particulate binder for negative electrode.

<Preparation of Negative Electrode Slurry Composition>

100 parts of synthetic graphite (volume-average particle diameter: 15.6 μm) and 1 part (in terms of solid content) of 2% aqueous solution of sodium salt of carboxymethyl cellulose ("MAC350HC" from Nippon Paper Industries Co., Ltd) as a thickening agent and ion-exchanged water were mixed to a solid concentration of 68%, and mixed for 60 minutes at 25° C. Subsequently, the mixture solution was adjusted to have a solid concentration of 62% by the addition of ion-exchanged water, and the mixture was further mixed at 25° C. for 15 minutes. To the mixture were added 1.5 parts (in terms of solid content) of the aqueous dispersion containing the particulate binder and ion-exchanged water to a final solid concentration of 52%, and further mixed for 10 minutes. The resultant mixture was subjected to defoaming treatment under reduced pressure to afford a slurry composition for negative electrode with good fluidity.

<Production of Negative Electrode>

The negative electrode slurry thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode active material layer is 80 μm in thickness.

<Preparation of Positive Electrode Slurry>

100 parts of $LiCoO_2$ as a positive electrode active material (volume-average particle diameter: 12 μm), 2 parts of acetylene black (HS-100, Denka Company Ltd.) as a conductor, 2 parts (in terms of solid content) of polvinylidene difluoride (#7208, KUREHA Corporation) as a positive electrode binder were mixed, and N-methyl pyrrolidone was added to a total solid concentration of 70%. These materials were mixed with a planetary mixer to prepare a positive electrode slurry.

<Production of Positive Electrode>

The positive electrode slurry thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a pre-press web of positive electrode was obtained. The pre-press web of positive electrode was rolled with a roll press to afford a positive electrode.

<Manufacture of Lithium Ion Secondary Battery>

The pressed positive electrode was cut into a 49 cm×5 cm piece. The functional layer-attached separator cut into a 55 cm×5.5 cm piece was placed on the surface of the positive electrode active material layer of the cut piece of the positive electrode. The pressed negative electrode was cut into a 50 cm×5.2 cm piece and placed on the separator surface which is opposite to the positive electrode such that the surface on the negative electrode active material layer side faces the functional layer-attached separator. This laminate was wound using a winder to afford a roll. The roll was pressed at 60° C. under a pressure of 0.5 MPa into a flat form and enclosed by an aluminum packaging case as a battery outer package. Electrolyte solution (solvent: ethylene carbonate (EC)/ethylmethyl carbonate (EMC)/vinylene carbonate (VC)=68.5/30/1.5 (by volume); electrolyte: 1M $LiPF_6$) was injected so as not to leave air. The roll was subjected to heat press treatment at a temperature of 80° C. and a pressure of 0.5 MPa for 10 seconds to press-bond the positive and negative electrodes to the separator to afford a laminate having the positive electrode and the functional layer-attached separator and a laminate having the negative electrode and the functional layer-attached separator. In order to tightly seal up the opening of the aluminum outer package, the aluminum package was closed by heat sealing at 150° C. In this way a spirally wound lithium ion secondary battery with a capacity of 800 mAh was manufactured.

The resultant lithium ion secondary battery was evaluated for output characteristics and high-temperature cycle characteristics. The results are shown in Table 1.

Examples 2 to 5

Functional layer compositions, functional layers, functional layer-attached separators, and lithium ion secondary batteries were prepared as in Example 1 except that the composition of the water-soluble polymer was changed as shown in Table 1. Various measurements and evaluations were carried out as in Example 1. The results are shown in Table 1.

Examples 6 and 7

Functional layer compositions, functional layers, functional layer-attached separators, and lithium ion secondary batteries were prepared as in Example 1 except that the composition of the water-insoluble polymer was changed as shown in Table 2, acrylic polymer (ACL2) was prepared in Example 6, and acrylic polymer (ACL3) was prepared in Example 7. Various measurements and evaluations were carried out in the same manner as in Example 1. The results are shown in Table 1.

Examples 8 and 9

Functional layer compositions, functional layers, functional layer-attached separators, and lithium ion secondary batteries were prepared as in Example 1 except that the amount of sodium dodecylbenzene sulfonate (dispersant) when preparing the water-insoluble polymer was changed to 1.0 part by mass in Example 8 or to 0.2 parts by mass in Example 9 so that acrylic polymer ($ACL1_S$) with a relatively small diameter was prepared in Example 8 and acrylic polymer ($ACL1_{L1}$) with a relatively large diameter was prepared in Example 9. Various measurements and evaluations were carried out in the same manner as in Example 1. The results are shown in Table 1.

Examples 10 and 11

Functional layer compositions, functional layers, functional layer-attached separators, and lithium ion secondary batteries were prepared as in Example 1 except that the amount of the water-insoluble polymer added when preparing the functional layer composition was changed as shown in Table 1. Various measurements and evaluations were carried out in the same manner as in Example 1. The results are shown in Table 1.

Example 12

A functional layer composition, a functional layer, a functional layer-attached separator, and a lithium ion secondary battery were prepared as in Example 1 except that 93 parts of butyl acrylate (acrylate monomer), 2 parts of acrylonitrile (acrylonitrile monomer), 2 parts of methacrylic acid (acid group-containing monomer), 1.5 parts of allyl glycidyl ether (hydrophilic cross-linkable monomer) and 1.5 parts of N-methylol acrylamide (hydrophilic cross-linkable monomer) as polymerizable monomers were mixed to prepare acrylic polymer (ACL4) as a water-insoluble polymer. Various measurements and evaluations were carried out in the same manner as in Example 1. The results are shown in Table 1.

Example 13

A functional layer composition, a functional layer, a functional layer-attached separator, and a lithium ion secondary battery were prepared as in Example 1 except that as non-conductive particles alumina particles ("LS 256" manufactured by Nippon Light Metal Co., Ltd., specific gravity: 3.94 g/cm$^3$, specific surface area: 6.0 m$^2$/g, volume-average particle diameter: 0.60 μm) were used. Various measurements and evaluations were carried out in the same manner as in Example 1. The results are shown in Table 1.

Example 14

A functional layer composition, a functional layer, a functional layer-attached separator, and a lithium ion secondary battery were prepared as in Example 1 except that 25 parts of organic particles having a core-shell structure prepared in the manner described below were used as non-conductive particles. Various measurements and evaluations were carried out in the same manner as in Example 1. The results are shown in Table 1.
<Preparation of Non-Conductive Particles>
As non-conductive particles, organic particles having a core-shell structure were prepared according to the following procedure.
A 5 MPa pressure-resistant vessel equipped with a stirrer was charged with a monomer composition for core which comprises 75 parts of methyl methacrylate (acrylate monomer), 4 parts of methacrylic acid (acid group-containing monomer), 1 part of ethylene dimethacrylate (cross-linkable monomer), 1 part of sodium dodecylbenzene sulfonate (emulsifier), 150 parts of ion-exchanged water, and 0.5 parts of potassium persulfate (polymerization initiator) and the monomer composition was fully stirred. The monomer composition was heated to 60° C.° to initiate polymerization. Polymerization was continued until the polymer conversion rate reached 96% to afford an aqueous dispersion liquid containing a core polymer for organic particles having a core-shell structure.
To this aqueous dispersion liquid was continuously added 20 parts of styrene (aromatic monovinyl monomer) as a monomer composition for shell and heated to 70° C. to continue polymerization. The reaction was quenched by cooling at the time when the polymerization conversion rate reached 96% to afford an aqueous dispersion liquid containing organic particles having a core-shell structure. The organic particles had a volume-average particle diameter of 0.50 μm, a specific gravity of 1.1 g/cm$^3$, and a specific surface area of 0.06 m$^2$/g. Further, the glass-transition temperature of the shell was measured according to the method for measuring the glass-transition temperature of the water-insoluble polymer described above. A measurement sample used for the measurement was prepared as follows: An aqueous dispersion liquid was prepared which contains a target polymer prepared by polymerizing the monomer composition for shell under the same condition as that for the preparation of the shell, and the aqueous dispersion liquid was dried to solid form. The glass-transition temperature of the shell was 105° C.

Example 15

A functional layer composition, a functional layer, a functional layer-attached separator, and a lithium ion secondary battery were prepared as in Example 1 except that the composition of the water-soluble polymer was changed as shown in Table 1. Various measurements and evaluations were carried out in the same manner as in Example 1. The results are shown in Table 1.

Example 16

For the preparation of a water-insoluble polymer, addition of a mixture of 13 parts of vinylidene fluoride and 5 parts of propylene hexafluoride (fluorine-containing monomers) as polymerizable monomers and 0.35 parts of sodium lauryl sulfate as an emulsifier from container A to pressure-resistant container B was started. At the same time, addition of 1 part of potassium persulfate as a polymerization initiator to the container B was started to initiate polymerization. The reaction temperature was maintained at 75° C.
4 hours after the initiation of polymerization (after addition of 70% of the entire monomer composition), 32 parts of styrene (aromatic monovinyl monomer) and 50 parts of 2-ethylhexyl acrylate (acrylate monomer) were added to the container B over 1.5 hours.
5.5 hours after the initiation of polymerization, the addition of the entire monomer composition was completed, and the mixture was then further heated to 85° C. and reacted for 6 hours.
When the polymerization conversion reached 97%, the reaction was quenched by cooling to afford a water-insoluble polymer. The water-insoluble polymer was adjusted to pH 8 by the addition of 5% sodium hydroxide aqueous solution. Unreacted monomers were then removed by thermal-vacuum distillation. After further cooling, a water dispersion liquid containing the desired water-insoluble polymer (solid concentration: 40%) was obtained. Using this water dispersion liquid, a functional layer composition, a functional layer, a functional layer-attached separator, and a lithium ion secondary battery were prepared as in Example 1. Various measurements and evaluations were carried out in the same manner as in Example 1. The results are shown in Table 1.

Examples 17 to 20

Water-insoluble polymers were prepared as in Example 16 except that 4 hours after the initiation of polymerization for preparing the water-insoluble polymer, as a fluorine-containing (meth)acrylate which is a fluorine-containing monomer to be added to the container B, 2,2,2-trifluoroethyl methacrylate (Examples 17 and 20), 2,2,2-trifluoroethyl acrylate (Examples 18) or 1,1,1,3,3,3-hexafluoroisopropyl acrylate (Example 19) was added in an amount shown in Table 2 and the amounts of the other polymerizable monomers were changed as shown in Table 2. The fluorine-containing acrylic polymers prepared in the respective Examples are referred to as F-ACL2 (Example 17), F-ACL3 (Example 18), F-ACL4 (Example 19) and F-ACL5 (Example 20). Functional layer compositions, functional layers, functional layer-attached separators, and lithium ion secondary batteries were prepared as in Example 1 except that the water-insoluble polymers obtained as described above were used. Various measurements and evaluations were carried out in the same manner as in Example 1. The results are shown in Table 1.

Comparative Example 1

A functional layer composition, a functional layer, a functional layer-attached separator, and a lithium ion secondary battery were prepared as in Example 1 except that a maleimide-maleic anhydride copolymer prepared as described below was used as the water-soluble polymer. Various measurements and evaluations were carried out in the same manner as in Example 1. The results are shown in Table 1.
<Preparation of Water-Soluble Polymer>
100 parts of isobutylene-maleic anhydride copolymer ("ISOBAM-04" manufactured by Kuraray Co., Ltd.) was placed in a reactor equipped with a stirrer and reacted for about 1 hour while blowing a mixed gas of ammonia/nitrogen (mixing capacity ratio 15/85) and cooling in a water bath until heat generation stopped. Subsequently, ammonia/nitrogen mixed gas was injected under pressure while heating in an oil bath, and the temperature was raised to 200° C. to effect imidization while distilling out water from the system. After completion of the reaction, the reaction product was taken out and dried by heating. The composition of the obtained maleimide-maleic anhydride copolymer was 50 mol % isobutylene, 30 mol % maleic anhydride and 20 mol % maleimide.

100 parts of the maleimide-maleic anhydride copolymer obtained above, 21.9 parts of sodium hydroxide and 487.7 parts of ion-exchanged water were placed in a reactor equipped with a stirrer and the mixture was stirred at 90° C. for 5 hours to afford a maleimide-maleic anhydride copolymer aqueous solution having a solid concentration of 20%.

Comparative Example 2

A functional layer composition, a functional layer, a functional layer-attached separator, and a lithium ion secondary battery were prepared as in Example 1 except that the composition of the water-soluble polymer was changed as shown in Table 1. Various measurements and evaluations were carried out in the same manner as in Example 1. The results are shown in Table 1.

Comparative Example 3

A functional layer composition, a functional layer, a functional layer-attached separator, and a lithium ion secondary battery were prepared as in Example 1 except that the amount of sodium dodecylbenzene sulfonate (dispersant) when preparing the water-insoluble polymer was changed to 0.3 parts by mass so that acrylic polymer ($ACL1_{L2}$) with a diameter that is larger than that of Example 9 was prepared. Various measurements and evaluations were carried out in the same manner as in Example 1. The results are shown in Table 1.

Comparative Example 4

A functional layer composition, a functional layer, a functional layer-attached separator, and a lithium ion secondary battery were prepared as in Example 1 except that when preparing the water-insoluble polymer, as polymerizable monomers, 94 parts of butyl acrylate (acrylate monomer), 2 parts of acrylonitrile (acrylonitrile monomer), 2 parts of methacrylic acid (acid group-containing monomer), and 1 part of allyl glycidyl ether and 1 part of N-methylol acrylamide (hydrophilic cross-linkable monomers) were mixed and the amount of sodium dodecylbenzene sulfonate (dispersant) was changed to 0.1 parts by mass to prepare acrylic resin (ACL5). Various measurements and evaluations were carried out in the same manner as in Example 1. The results are shown in Table 1.

In Tables 1and 2 below,
"(M)AAm" refers to (meth)acrylamide copolymer,
"EDMA" refers to ethylene glycol dimethacrylate,
"AAm" refers to acrylamide,
"AA" refers to acrylic acid,
"MI-MAH" refers to a maleimide-maleic anhydride copolymer,
"2EHA" refers to 2-ethylhexyl acrylate,
"ST" refers to styrene,
"AGE" refers to allyl glycidyl ether,
"AMA" refers to s allyl methacrylate,
"BA" refers to butyl acrylate,
"NMA" refers to N-methylol acrylamide,
"MAA" refers to methacrylic acid,
"AN" refers to acrylonitrile,
"VDF" refers to vinylidene fluoride,
"HFP" refers to propylene hexafluoride,
"TFEMA" refers to 2,2,2-trifluoroethyl methacrylate,
"TFEA" refers to 2,2,2-trifluoroethyl acrylate, and
"HFIPA" refers to 1,1,1,3,3,3-hexafluoroisopropyl acrylate.

TABLE 1

| | | | | Examples | | | | | | |
|---|---|---|---|---|---|---|---|---|---|---|
| | | | | 1 | 2 | 3 | 4 | 5 | 6 | 7 |
| Functional layer composition | Non-conductive particles | Type | | Barium sulfate | Barium sulfate | Barium sulfate | Barium sulfate | Barium sulfate | Barium sulfate | Barium sulfate |
| | | Volume-average particle diameter [μm] | | 0.50 | 0.50 | 0.50 | 0.50 | 0.50 | 0.50 | 0.50 |
| | | Specific surface area [m²/g] | | 5.5 | 5.5 | 5.5 | 5.5 | 5.5 | 5.5 | 5.5 |
| | | Content [parts by mass] | | 100 | 100 | 100 | 100 | 100 | 100 | 100 |
| | Water-soluble polymer | Composition | Cross-linkable monomer unit | Type | (M)AAm EDMA | (M)AAm EDMA | (M)AAm EDMA | (M)AAm EDMA | (M)AAm | (M)AAm EDMA | (M)AAm EDMA |
| | | | | Proportion [% by mass] | 0.1 | 0.01 | 1.7 | 0.1 | — | 0.1 | 0.1 |
| | | | (Meth)acrylamide monomer unit | Type | AAm | AAm | AAm | AAm | AAm | AAm | AAm |
| | | | | Proportion [% by mass] | 89.9 | 89.99 | 88.3 | 70.0 | 97.0 | 89.9 | 89.9 |
| | | | Acid group-containing monomer unit | Type | AA | AA | AA | AA | AA | AA | AA |
| | | | | Proportion [% by mass] | 10.0 | 10.00 | 10.0 | 29.9 | 3.0 | 10.0 | 10.0 |
| | | Properties | Content ratio of (meth)acrylamide monomer unit to acid group-containing monomer unit [times] | | 8.99 | 9.00 | 8.83 | 2.34 | 32.33 | 8.99 | 8.99 |
| | | | Weight-average molecular weight [—] | | 250,000 | 210,000 | 700,000 | 230,000 | 200,000 | 250,000 | 250,000 |
| | | | Degree of swelling in electrolyte solution [times] | | 1.3 | 1.6 | 1.1 | 1.7 | 1.3 | 1.3 | 1.3 |
| | | Content [parts by mass] | | 2 | 2 | 2 | 2 | 2 | 2 | 2 |
| | Water-insoluble polymer | Type | | ACL1 | ACL1 | ACL1 | ACL1 | ACL1 | ACL2 | ACL3 |
| | | Properties | Glass-transition temperature [°C] | | 10 | 10 | 10 | 10 | 10 | 5 | 10 |
| | | | Degree of swelling in electrolyte solution [times] | | 1.9 | 1.9 | 1.9 | 1.9 | 1.9 | 2.3 | 1.5 |
| | | | Volume-average particle diameter [μm] | | 0.18 | 0.18 | 0.18 | 0.18 | 0.18 | 0.22 | 0.20 |
| | | Content [parts by mass] | | 3.5 | 3.5 | 3.5 | 3.5 | 3.5 | 3.5 | 3.5 |
| | Particle diameter ratio of water-insoluble polymer to non-conductive particles [—] | | | 0.36 | 0.36 | 0.36 | 0.36 | 0.36 | 0.44 | 0.40 |
| | Mass ratio of water-insoluble polymer to water-soluble polymer [—] | | | 1.75 | 1.75 | 1.75 | 1.75 | 1.75 | 1.75 | 1.75 |
| Evaluation | Dispersion stability of functional layer composition | | | A | A | A | A | B | A | A |
| | Heat contraction resistance of functional layer | | | A | A | A | B | A | A | A |
| | Resistance to vibration-causing detachment of components of functional layer | | | A | A | A | A | A | A | A |
| | Peel strength of functional layer | | | A | A | A | B | A | A | A |
| | Output characteristics of secondary battery | | | A | B | B | A | B | B | A |
| | High-temperature cycle characteristics of secondary battery | | | A | B | A | B | A | B | A |

TABLE 1-continued

| | | | | Examples | | | | | | |
|---|---|---|---|---|---|---|---|---|---|---|
| | | | | 8 | 9 | 10 | 11 | 12 | 13 |
| Functional layer composition | Non-conductive particles | Type | | Barium sulfate | Barium sulfate | Barium sulfate | Barium sulfate | Barium sulfate | Alumina |
| | | Volume-average particle diameter [μm] | | 0.50 | 0.50 | 0.50 | 0.50 | 0.50 | 0.60 |
| | | Specific surface area [m²/g] | | 5.5 | 5.5 | 5.5 | 5.5 | 5.5 | 6.0 |
| | | Content [parts by mass] | | 100 | 100 | 100 | 100 | 100 | 100 |
| | Water-soluble polymer | Type | | (M)AAm EDMA | (M)AAm EDMA | (M)AAm EDMA | (M)AAm EDMA | (M)AAm EDMA | (M)AAm EDMA |
| | | Composition | Cross-linkable monomer unit | Type | | | | | | |
| | | | | Proportion [% by mass] | 0.1 | 0.1 | 0.1 | 0.1 | 0.1 | 0.1 |
| | | | (Meth)acrylamide monomer unit | Type | AAm | AAm | AAm | AAm | AAm | AAm |
| | | | | Proportion [% by mass] | 89.9 | 89.9 | 89.9 | 89.9 | 89.9 | 89.9 |
| | | | Acid group-containing monomer unit | Type | AA | AA | AA | AA | AA | AA |
| | | | | Proportion [% by mass] | 10.0 | 10.0 | 10.0 | 10.0 | 10.0 | 10.0 |
| | | Properties | Content ratio of (meth)acrylamide monomer unit to acid group-containing monomer unit [times] | | 8.99 | 8.99 | 8.99 | 8.99 | 8.99 | 8.99 |
| | | | Weight-average molecular weight [—] | | 250,000 | 250,000 | 250,000 | 250,000 | 250,000 | 250,000 |
| | | | Degree of swelling in electrolyte solution [times] | | 1.3 | 1.3 | 1.3 | 1.3 | 1.3 | 1.3 |
| | | Content [parts by mass] | | 2 | 2 | 2 | 2 | 2 | 2 |
| | Water-insoluble polymer | Type | | ACL1$_s$ | ACL1$_{L1}$ | ACL1 | ACL1 | ACL4 | ACL1 |
| | | Properties | Glass-transition temperature [° C.] | | 10 | 10 | 10 | 10 | −30 | 10 |
| | | | Degree of swelling in electrolyte solution [times] | | 1.9 | 1.9 | 1.9 | 1.9 | 2.5 | 1.9 |
| | | | Volume-average particle diameter [μm] | | 0.08 | 0.28 | 0.18 | 0.18 | 0.25 | 0.18 |
| | | Content [parts by mass] | | 3.5 | 3.5 | 4.6 | 1 | 3.5 | 3.5 |
| | Particle diameter ratio of water-insoluble polymer to non-conductive particles [—] | | | 0.16 | 0.56 | 0.36 | 0.36 | 0.50 | 0.30 |
| | Mass ratio of water-insoluble polymer to water-soluble polymer [—] | | | 1.75 | 1.75 | 2.3 | 0.5 | 1.75 | 1.75 |
| Evaluation | Dispersion stability of functional layer composition | | | A | A | A | A | A | A |
| | Heat contraction resistance of functional layer | | | A | B | A | B | A | A |
| | Resistance to vibration-causing detachment of components of functional layer | | | A | B | A | B | B | A |
| | Peel strength of functional layer | | | A | B | A | B | B | A |
| | Output characteristics of secondary battery | | | C | A | B | B | B | A |
| | High-temperature cycle characteristics of secondary battery | | | B | A | A | A | B | A |

TABLE 1-continued

|  |  |  |  | Examples | | | | | |
|---|---|---|---|---|---|---|---|---|---|
|  |  |  |  | 14 | 15 | 16 | 17 | 18 | 19 |
| Functional layer composition | Non-conductive particles | Type | | Organic particles | Barium sulfate | Barium sulfate | Barium sulfate | Barium sulfate | Barium sulfate |
|  |  | Volume-average particle diameter [μm] | | 0.50 | 0.50 | 0.50 | 0.50 | 0.50 | 0.50 |
|  |  | Specific surface area [m²/g] | | 0.06 | 5.5 | 5.5 | 5.5 | 5.5 | 5.5 |
|  |  | Content [parts by mass] | | 25 | 100 | 100 | 100 | 100 | 100 |
|  | Water-soluble polymer | Type | | (M)AAm EDMA | (M)AAm EDMA | (M)AAm EDMA | (M)AAm EDMA | (M)AAm EDMA | (M)AAm EDMA |
|  |  | Composition | Cross-linkable monomer unit | Type | | | | | |
|  |  |  |  | Proportion [% by mass] | 0.1 | 0.1 | 0.1 | 0.1 | 0.1 | 0.1 |
|  |  |  | (Meth)acrylamide monomer unit | Type | AAm | AAm | AAm | AAm | AAm | AAm |
|  |  |  |  | Proportion [% by mass] | 89.9 | 74.9 | 89.9 | 89.9 | 89.9 | 89.9 |
|  |  |  | Acid group-containing monomer unit | Type | AA | AA | AA | AA | AA | AA |
|  |  |  |  | Proportion [% by mass] | 10.0 | 25.0 | 10.0 | 10.0 | 10.0 | 10.0 |
|  |  | Properties | Content ratio of (meth)acrylamide monomer unit to acid group-containing monomer unit [times] | | 8.99 | 3.00 | 8.99 | 8.99 | 8.99 | 8.99 |
|  |  |  | Weight-average molecular weight [—] | | 250,000 | 290,000 | 250,000 | 250,000 | 250,000 | 250,000 |
|  |  |  | Degree of swelling in electrolyte solution [times] | | 1.3 | 1.3 | 1.3 | 1.3 | 1.3 | 1.3 |
|  |  | Content [parts by mass] | | 2 | 2 | 2 | 2 | 2 | 2 |
|  | Water-insoluble polymer | Type | | ACL1 | ACL1 | F-ACL1 | F-ACL2 | F-ACL3 | F-ACL4 |
|  |  | Properties | Glass-transition temperature [° C.] | | 10 | 10 | 0 | 10 | 5 | 5 |
|  |  |  | Degree of swelling in electrolyte solution [times] | | 1.9 | 1.9 | 2.3 | 1.9 | 1.8 | 1.9 |
|  |  |  | Volume-average particle diameter [μm] | | 0.18 | 0.18 | 0.11 | 0.20 | 0.25 | 0.22 |
|  |  | Content [parts by mass] | | 3.5 | 3.5 | 3.5 | 3.5 | 3.5 | 3.5 |
|  | Particle diameter ratio of water-insoluble polymer to non-conductive particles [—] | | | 0.36 | 0.36 | 0.22 | 0.40 | 0.50 | 0.44 |
|  | Mass ratio of water-insoluble polymer to water-soluble polymer [—] | | | 1.75 | 1.75 | 1.75 | 1.75 | 1.75 | 1.75 |
| Evaluation | Dispersion stability of functional layer composition | | | A | A | A | A | A | A |
|  | Heat contraction resistance of functional layer | | | A | B | B | B | B | B |
|  | Resistance to vibration-causing detachment of components of functional layer | | | A | A | A | A | A | A |
|  | Peel strength of functional layer | | | A | A | B | B | B | B |
|  | Output characteristics of secondary battery | | | A | B | B | B | B | B |
|  | High-temperature cycle characteristics of secondary battery | | | A | A | A | A | A | A |

TABLE 1-continued

| | | | | Examples | Comparative Examples | | | |
|---|---|---|---|---|---|---|---|---|
| | | | | 20 | 1 | 2 | 3 | 4 |
| Functional layer composition | Non-conductive particles | Type | | Barium sulfate | Barium sulfate | Barium sulfate | Barium sulfate | Barium sulfate |
| | | Volume-average particle diameter [μm] | | 0.50 | 0.50 | 0.50 | 0.50 | 0.50 |
| | | Specific surface area [m²/g] | | 5.5 | 5.5 | 5.5 | 5.5 | 5.5 |
| | | Content [parts by mass] | | 100 | 100 | 100 | 100 | 100 |
| | Water-soluble polymer | Composition | Cross-linkable monomer unit | Type | (M)AAm EDMA | MI-MAH | (M)AAm EDMA | (M)AAm EDMA | (M)AAm EDMA |
| | | | | Proportion [% by mass] | 0.1 | — | 0.1 | 0.1 | 0.1 |
| | | | (Meth)acrylamide monomer unit | Type | AAm | — | AAm | AAm | AAm |
| | | | | Proportion [% by mass] | 89.9 | — | 29.9 | 89.9 | 89.9 |
| | | | Acid group-containing monomer unit | Type | AA | — | AA | AA | AA |
| | | | | Proportion [% by mass] | 10.0 | — | 70.0 | 10.0 | 10.0 |
| | | Properties | Content ratio of (meth)acrylamide monomer unit to acid group-containing monomer unit [times] | | 8.99 | — | 0.43 | 8.99 | 8.99 |
| | | | Weight-average molecular weight [—] | | 250,000 | 350,000 | 250,000 | 250,000 | 250,000 |
| | | | Degree of swelling in electrolyte solution [times] | | 1.3 | 2.1 | 2.2 | 1.3 | 1.3 |
| | Water-insoluble polymer | Type | | F-ACL5 | ACL1 | ACL1 | ACL1$_{L2}$ | ACL5 |
| | | Properties | Glass-transition temperature [° C.] | | 15 | 10 | 10 | 10 | −30 |
| | | | Degree of swelling in electrolyte solution [times] | | 1.4 | 1.9 | 1.9 | 1.9 | 3.5 |
| | | | Volume-average particle diameter [μm] | | 0.20 | 0.18 | 0.18 | 0.35 | 0.37 |
| | | Content [parts by mass] | | 3.5 | 3.5 | 3.5 | 3.5 | 3.5 |
| | | Particle diameter ratio of water-insoluble polymer to non-conductive particles [—] | | 0.40 | 0.36 | 0.36 | 0.70 | 0.74 |
| | | Mass ratio of water-insoluble polymer to water-soluble polymer [—] | | 1.75 | 1.75 | 1.75 | 1.75 | 1.75 |
| Evaluation | Dispersion stability of functional layer composition | | | A | B | C | A | C |
| | Heat contraction resistance of functional layer | | | B | B | C | C | C |
| | Resistance to vibration-causing detachment of components of functional layer | | | A | D | D | C | C |
| | Peel strength of functional layer | | | B | A | A | C | D |
| | Output characteristics of secondary battery | | | B | D | D | B | C |
| | High-temperature cycle characteristics of secondary battery | | | A | C | D | C | C |

TABLE 2

| | | | Others | Example 6 | Example 7 | Example 12 | Example 16 |
|---|---|---|---|---|---|---|---|
| | | | | Water-insoluble polymer type | | | |
| | | | ACL1<br>ACL1$_s$<br>ACL1$_{L1}$<br>ACL1$_{L2}$ | ACL2 | ACL3 | ACL4 | F-ACL1 |
| Composition | (Meth)acrylate monomer unit | Type | 2EHA | 2EHA | 2EHA | BA | 2EHA |
| | | Proportion [% by mass] | 64 | 66 | 63.5 | 93 | 50 |
| | Aromatic vinyl monomer unit | Type | ST | ST | ST | — | ST |
| | | Proportion [% by mass] | 30 | 30 | 30 | — | 32 |
| | Acid group-containg monomer unit | Type | AA | AA | AA | MAA | — |
| | | Proportion [% by mass] | 4 | 4 | 4 | 2 | — |
| | Hydrophilic cross-linkable monomer unit | Type | AGE | — | AGE | AGE/NMA | — |
| | | Proportion [% by mass] | 1.8 | — | 1.8 | 1.5/1.5 | — |
| | Hydrophobic cross-linkable monomer unit | Type | AMA | — | AMA | — | — |
| | | Proportion [% by mass] | 0.2 | — | 0.7 | — | — |
| | (Meth)acrylonitrile monomer unit | Type | — | — | — | AN | — |
| | | Proportion [% by mass] | — | — | — | 2 | — |
| | Fluorine-containing monomer unit | Fluorine-containing olefin | Type | — | — | — | — | VDF/HFP |
| | | | Proportion [% by mass] | — | — | — | — | 13/5 |
| | | Fluorine-containing (meth)acrylate | Type | — | — | — | — | — |
| | | | Proportion [% by mass] | — | — | — | — | — |

| | | | Example 17 | Example 18 | Example 19 | Example 20 | Comparative Example 4 |
|---|---|---|---|---|---|---|---|
| | | | Water-insoluble polymer type | | | | |
| | | | F-ACL2 | F-ACL3 | F-ACL4 | F-ACL5 | ACL5 |
| Composition | (Meth)acrylate monomer unit | Type | 2EHA | 2EHA | 2EHA | 2EHA | BA |
| | | Proportion [% by mass] | 50 | 50 | 50 | 50 | 94 |
| | Aromatic vinyl monomer unit | Type | ST | ST | ST | ST | — |
| | | Proportion [% by mass] | 30 | 30 | 30 | 28 | — |
| | Acid group-containg monomer unit | Type | — | — | — | — | MAA |
| | | Proportion [% by mass] | — | — | — | — | 2 |
| | Hydrophilic cross-linkable monomer unit | Type | — | — | — | — | AGE/NMA |
| | | Proportion [% by mass] | — | — | — | — | 1/1 |
| | Hydrophobic cross-linkable monomer unit | Type | — | — | — | — | — |
| | | Proportion [% by mass] | — | — | — | — | — |
| | (Meth)acrylonitrile monomer unit | Type | — | — | — | — | AN |
| | | Proportion [% by mass] | — | — | — | — | 2 |
| | Fluorine-containing monomer unit | Fluorine-containing olefin | Type | VDF/HFP | VDF/HFP | VDF/HFP | VDF/HFP | — |
| | | | Proportion [% by mass] | 13/5 | 13/5 | 13/5 | 13/5 | — |
| | | Fluorine-containing (meth)acrylate | Type | TFEMA | TFEA | HFIPA | TFEMA | — |
| | | | Proportion [% by mass] | 2 | 2 | 2 | 4 | — |

It can be seen from Table 1 that Examples 1 to 20 wherein non-conductive particles, a water-soluble polymer having a degree of swelling in electrolyte solution of greater than 1.0 time and 2.0 times or less, and a water-insoluble polymer having a volume-average particle diameter of 0.01 µm or more and 0.30 µm or less were used in combination provided functional layers having excellent resistance to vibration-causing detachment of components and excellent heat contraction resistance and therefore would improve electrical characteristics (in particular, high-temperature cycle characteristics and output characteristics) of a secondary battery. It can also be seen from Table 1 that Comparative Examples 1 and 2 wherein the water-soluble polymer had a degree of swelling in electrolyte solution of greater than 2 times provided functional layers having low resistance to vibration-causing detachment of components and low heat contraction resistance and could not improve electrical characteristics (in particular, high-temperature cycle characteristics and output characteristics) of a secondary battery. It can also be seen from Table 1 that Comparative Examples 3 and 4 wherein the water-insoluble polymer had a volume-average particle diameter of greater than 0.30 µm provided functional layers having low resistance to vibration-causing detachment of components and low heat contraction resistance and could not improve electrical characteristics (in particular, high-temperature cycle characteristics and output characteristics) of a secondary battery.

INDUSTRIAL APPLICABILITY

According to the present disclosure, it is possible to provide a composition for non-aqueous secondary battery functional layer which can be used to form a non-aqueous secondary battery functional layer having excellent resistance to vibration-causing detachment of components in electrolyte solution and excellent heat contraction resistance. Using this composition it is possible to suitably form a non-aqueous secondary battery functional layer having excellent resistance to vibration-causing detachment of components in electrolyte solution and excellent heat contraction resistance, and a non-aqueous secondary battery having this functional layer.

The invention claimed is:

1. A composition for non-aqueous secondary battery functional layer, comprising:
   non-conductive particles;
   a water-soluble polymer comprising 70% by mass or more and 99% by mass or less of a (meth)acrylamide monomer unit and having a degree of swelling in electrolyte solution of greater than 1.0 time and 2.0 times or less; and a water-insoluble polymer having a volume-average particle diameter of 0.01 μm or more and 0.30 μm or less, wherein the volume-average particle diameter of the water-insoluble polymer is 0.15 times or more and 0.60 times or less a volume-average particle diameter of the non-conductive particles.

2. The composition for non-aqueous secondary battery functional layer according to claim 1, wherein the water-soluble polymer comprises 0.01% by mass or more and 2.0% by mass or less of a cross-linkable monomer unit.

3. The composition for non-aqueous secondary battery functional layer according to claim 1, wherein the water-insoluble polymer has a degree of swelling in electrolyte solution of greater than 1.0 time and 3.0 times or less.

4. The composition for non-aqueous secondary battery functional layer according to claim 1, wherein the composition comprises the water-insoluble polymer in an amount 0.1 times or more and 2.5 times or less the amount of the water-soluble polymer by mass.

5. A non-aqueous secondary battery functional layer formed using the composition for non-aqueous secondary battery functional layer according to claim 1.

6. A non-aqueous secondary battery comprising the non-aqueous secondary battery functional layer according to claim 5.

* * * * *